(12) United States Patent
Bhattacharya et al.

(10) Patent No.: US 10,097,372 B2
(45) Date of Patent: Oct. 9, 2018

(54) METHOD FOR RESOURCE OPTIMIZED NETWORK VIRTUALIZATION OVERLAY TRANSPORT IN VIRTUALIZED DATA CENTER ENVIRONMENTS

(71) Applicant: Ciena Corporation, Hanover, MD (US)

(72) Inventors: Somen Bhattacharya, Santa Clara, CA (US); Jaffar Hameed Abdul Kather Jilani, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 370 days.

(21) Appl. No.: 14/151,024

(22) Filed: Jan. 9, 2014

(65) Prior Publication Data
US 2015/0195178 A1    Jul. 9, 2015

(51) Int. Cl.
| | |
|---|---|
| *G06F 9/455* | (2018.01) |
| *H04L 12/46* | (2006.01) |
| *H04L 12/741* | (2013.01) |
| *H04L 12/24* | (2006.01) |
| *H04L 12/931* | (2013.01) |
| *H04L 12/723* | (2013.01) |

(52) U.S. Cl.
CPC ...... *H04L 12/4633* (2013.01); *H04L 41/0893* (2013.01); *H04L 45/745* (2013.01); *H04L 12/4645* (2013.01); *H04L 45/50* (2013.01); *H04L 49/70* (2013.01)

(58) Field of Classification Search
CPC ............... G06F 9/45558; G06F 9/5086; G06F 11/3065; H04L 12/4641
See application file for complete search history.

(56) References Cited

U.S. PATENT DOCUMENTS

| | | | | |
|---|---|---|---|---|
| 8,175,863 | B1* | 5/2012 | Ostermeyer | ........ G06F 17/5009 703/13 |
| 2005/0273341 | A1* | 12/2005 | Hoffesommer | ........ G06Q 10/04 705/35 |
| 2009/0254916 | A1* | 10/2009 | Bose | ..................... G06F 9/5066 718/104 |
| 2011/0078679 | A1* | 3/2011 | Bozek | ..................... G06F 9/455 718/1 |

(Continued)

OTHER PUBLICATIONS

FrescoBot, Virtual Extensible Lan, Dec. 24, 2013, Wikipedia, pp. 1-2.*

(Continued)

*Primary Examiner* — Emerson Puente
*Assistant Examiner* — Zhi Chen
(74) *Attorney, Agent, or Firm* — Clements Bernard Walker PLLC; Christopher L. Bernard; Lawrence A. Baratta, Jr.

(57) ABSTRACT

A method for resource optimized network virtualization overlay transport in a virtualized data center environment includes an optimized virtualized transport mechanism based on MPLS-TP tunneling technology. The transport mechanism may include a usage monitoring and resource usage advertisement mechanism based on IGP-TE protocol extension. Also, the transport mechanism may include a path computation engine (PCE) based optimal path computation for a virtualized transport tunnel used to carry VM-to-VM traffic across the virtualized data center. Additionally, the transport mechanism may include a SDN controller for provisioning and control of virtualized machines and a virtualized transport system.

17 Claims, 17 Drawing Sheets

(56) References Cited

U.S. PATENT DOCUMENTS

| | | | | |
|---|---|---|---|---|
| 2011/0179301 | A1* | 7/2011 | Liu | G06F 1/3203 713/340 |
| 2012/0054367 | A1* | 3/2012 | Ramakrishnan | G06F 9/4856 709/242 |
| 2012/0102228 | A1* | 4/2012 | Cugini | H04L 45/04 709/242 |
| 2013/0151707 | A1* | 6/2013 | Boutin | G06F 9/5027 709/226 |
| 2014/0222953 | A1* | 8/2014 | Karve | G06F 9/455 709/217 |
| 2015/0039764 | A1* | 2/2015 | Beloglazov | H04L 47/70 709/226 |
| 2015/0040121 | A1* | 2/2015 | Barabash | G06F 9/45558 718/1 |
| 2015/0040129 | A1* | 2/2015 | Park | G06F 9/45558 718/1 |

OTHER PUBLICATIONS

CmdrObot, Network Virtualization using Generic Routing Encapsulation, Jun. 23, 2013, Wikipedia, p. 1.*
Kompella et al., "RFC 4206—Label Switched Paths (LSP) Hierarchy with Generalized Multi-Protocol Label Switching (GMPLS) Traffic Engineering (TE)", Oct. 2005, The Internet Society, pp. 1-28.*
Kompella et al., "RFC 4203—OSPF Extensions in Support of Generalized Multi-Protocol Label Switching (GMPLS)", Oct. 2005, The Internet Society, pp. 1-22.*
Kompella et al., "RFC 4205—Intermediate System to Intermediate System (IS-IS) Extensions in Support of Generalized Multi-Protocol Label Switching (GMPLS)", Oct. 2005, The Internet Society, pp. 1-22.*
JL. Le Roux et al., "OSPF Protocol Extensions for Path Computation Element (PCE) Discovery." Network Working Group, Request for Comments: 5088. Category: Standards Track. Jan. 2008. p. 1-20.
JL. Le Roux et al., "IS-IS Protocol Extensions for Path Computation Element (PCE) Discovery." Network Working Group, Request for Comments: 5089. Category: Standards Track. Jan. 2008. p. 1-17.
OpenFlow Switch Specication. Version 1.4.0. Oct. 14, 2013. © 2013; The Open Networking Foundation. p. 1-205.
D. Awduche et al., "RSVP-TE: Extensions to RSVP for LSP Tunnels". Network Working Group, Request for Comments: 3209, Category: Standards Track. Dec. 2001. p. 1-61.
E. Mannie, "Generalized Multi-Protocol Label Switching (GMPLS) Architecture". Network Working Group, Request for Comments: 3945, Category: Standards Track. Oct. 2004. p. 1-69.
L. Berger, "Generalized Multi-Protocol Label Switching (GMPLS) Signaling Functional Description". Network Working Group, Request for Comments: 3471, Category: Standards Track. Jan. 2003. p. 1-69.
L. Berger, "Generalized Multi-Protocol Label Switching (GMPLS) Signaling Resource ReserVation Protocol-Traffic Engineering (RSVP-TE) Extensions". Network Working Group, Request for Comments: 3473, Category: Standards Track. Jan. 2003. p. 1-42.
K. Kompella et al., "Routing Extensions in Support of Generalized Multi-Protocol Label Switching (GMPLS)". Network Working Group, Request for Comments: 4202 Category: Standards Track. Oct. 2005. p. 1-27.
K. Kompella et al., "OSPF Extensions in Support of Generalized Multi-Protocol Label Switching (GMPLS)". Network Working Group, Request for Comments: 4203. Updates: 3630. Category: Standards Track. Oct. 2005. p. 1-11.
T. Li, "IS-IS Extensions for Traffic Engineering." Network Working Group, Request for Comments: 5305. Obsoletes: 3784 Category: Standards Track. Oct. 2008. p. 1-17.
K. Kompella et al., "IS-IS Extensions in Support of Generalized Multi-Protocol Label Switching (GMPLS)". Network Working Group, Request for Comments: 5307. Obsoletes: 4205. Updates: 5305. Category: Standards Track. Oct. 2008. p. 1-12.
J.P. Lang et al., "RSVP-TE Extensions in Support of End-to-End Generalized Multi-Protocol Label Switching (GMPLS) Recovery". Network Working Group, Request for Comments: 4872. Updates: 5305. Category: Standards Track. May 2007. p. 1-47.
L. Berger et al., "GMPLS Segment Recovery". Network Working Group, Request for Comments: 4873. Updates: 3473, 4872. Category: Standards Track. May 2007. p. 1-25.
J. Lang et al., "Generalized Multi-Protocol Label Switching (GMPLS) Recovery Functional Specification". Network Working Group, Request for Comments: 4426. Category: Standards Track. Mar. 2006. p. 1-23.
K. Kompella et al., "Label Switched Paths (LSP) Hierarchy with Generalized Multi-Protocol Label Switching (GMPLS) Traffic Engineering (TE)". Network Working Group, Request for Comments: 4206. Category: Standards Track. Oct. 2005. p. 1-14.
K. Shiomoto et al., "Label Switched Paths (LSP) Hierarchy with Generalized Multi-Protocol Label Switching (GMPLS) Traffic Engineering (TE)". Internet Engineering Task Force (IETF), Request for Comments: 6107. Updates: 3477, 4206. Category: Standards Track. ISSN: 2070-1721. Feb. 2011. p. 1-30.
A. Farrel et al., "A Framework for Inter-Domain Multiprotocol Label Switching Traffic Engineering". Network Working Group, Request for Comments: 4726 Category: Informational. Nov. 2006. p. 1-22.
A. Farrel et al., "Inter-Domain MPLS and GMPLS Traffic Engineering—Resource Reservation Protocol-Traffic Engineering (RSVP-TE) Extensions". Network Working Group, Request for Comments: 5151. Updates: 3209, 3473. Category: Standards Track. Feb. 2008. p. 1-25.
A. Ayyangar et al., "Label Switched Path Stitching with Generalized Multiprotocol Label Switching Traffic Engineering (GMPLS TE)". Network Working Group, Request for Comments: 5150. Category: Standards Track. Feb. 2008. p. 1-19.
F. Le Faucheur et al., "Multi-Protocol Label Switching (MPLS) Support of Differentiated Services". Network Working Group, Request for Comments: 3270. Category: Standards Track. May 2002. p. 1-64.
F. Le Faucheur, "Requirements for Support of Differentiated Services-aware MPLS Traffic Engineering". Network Working Group, Request for Comments: 3564. Category: Informational. Jul. 2003. p. 1-22.
F. Le Faucheur, "Protocol Extensions for Support of Diffserv-aware MPLS Traffic Engineering". Network Working Group, Request for Comments: 4124. Category: Standards Track. Jun. 2005. p. 1-37.
M. Bocci et al., "A Framework for MPLS in Transport Networks". Internet Engineering Task Force (IETF), Request for Comments: 5921. Category: Informational. Jul. 2010. p. 1-56.
B. Niven-Jenkins et al., "Requirements of an MPLS Transport Profile." Network Working Group, Request for Comments: 5654. Category: Standards Track. Sep. 2009. p. 1-31.
L. Andersson et al., "MPLS Transport Profile (MPLS-TP) Control Plane Framework." Internet Engineering Task Force (IETF), Request for Comments: 6373. Category: Informational. Sep. 2011. p. 1-57.
D. Frost et al., "MPLS Transport Profile Data Plane Architecture." Internet Engineering Task Force (IETF), Request for Comments: 5960. Category: Standards Track. ISSN: 2070-1721. Aug. 2010. p. 1-15.
M. Bocci et al., "MPLS Transport Profile (MPLS-TP) Identifiers." Internet Engineering Task Force (IETF), Request for Comments: 6370. Category: Standards Track. ISSN: 2070-1721. Sep. 2011. p. 1-17.
N. Sprecher et al., "MPLS Transport Profile (MPLS-TP) Survivability Framework." Internet Engineering Task Force (IETF), Request for Comments: 6372. Category: Informational. ISSN: 2070-1721. Sep. 2011. p. 1-56.
M. Bocci et al., "MPLS Generic Associated Channel." Network Working Group, Request for Comments: 5586. Updates: 3032, 4385, 5085. Category: Standards Track. Jun. 2009. p. 1-19.
M. Bocci et al., "An Architecture for Multi-Segment Pseudowire Emulation Edge-to-Edge." Network Working Group, Request for Comments: 5659. Category: Informational. Oct. 2009. p. 1-24.
L. Martini et al., "Segmented Pseudowire." Internet Engineering Task Force (IETF), Request for Comments: 6073. Category: Standards Track. ISSN: 2070-1721. Jan. 2011. p. 1-43.

(56) References Cited

OTHER PUBLICATIONS

S. Bryant et al., "Pseudo Wire Emulation Edge-to-Edge (PWE3) Architecture." Network Working Group, Request for Comments: 3985. Category: Informational. Mar. 2005. p. 1-42.
M. Lasserre et al., "Virtual Private LAN Service (VPLS) Using Label Distribution Protocol (LDP) Signaling." Network Working Group, Request for Comments: 4762. Category: Standards Track. Jan. 2007. p. 1-31.
Y. Weingarten et al., "MPLS Transport Profile (MPLS-TP) Linear Protection." Internet Engineering Task Force (IETF), Request for Comments: 6378. Category: Standards Track. ISSN: 2070-1721. Oct. 2011. p. 1-45.
A. Takacs et al., "GMPLS Asymmetric Bandwidth Bidirectional Label Switched Paths (LSPs)." Internet Engineering Task Force (IETF), Request for Comments: 6387. Obsoletes: 5467. Category: Standards Track. ISSN: 2070-1721. Sep. 2011. p. 1-11.
L. Berger, "Usage of the RSVP Association Object." Internet Engineering Task Force (IETF), Request for Comments: 6689. Category: Informational. ISSN: 2070-1721. Jul. 2012. p. 1-11.
L. Berger et al., "RSVP Association Object Extensions." Internet Engineering Task Force (IETF), Request for Comments: 6780. Updates: 2205, 3209, 3473, 4872. Category: Standards Track. ISSN: 2070-1721. Oct. 2012. p. 1-17.
D. Frost et al., "MPLS Generic Associated Channel (G-ACh) Advertisement Protocol draft-ietf-mpls-gach-adv-08." MPLS, Internet-Draft. Intended status: Standards Track. Expires: Dec. 9, 2013. p. 1-22.
E. Rosen et al., "Multicast in MPLS/BGP IP VPNs." Internet Engineering Task Force (IETF), Request for Comments: 6513. Category: Standards Track. ISSN: 2070-1721. Feb. 2012. p. 1-88.
R. Aggarwal et al., "BGP Encodings and Procedures for Multicast in MPLS/BGP IP VPNs." Internet Engineering Task Force (IETF), Request for Comments: 6514. Category: Standards Track. ISSN: 2070-1721. Feb. 2012. p. 1-59.
E. Rosen et al., "Provisioning, Auto-Discovery, and Signaling in Layer 2 Virtual Private Networks (L2VPNs)." Internet Engineering Task Force (IETF), Request for Comments: 6074. Category: Standards Track. ISSN: 2070-1721. Jan. 2011. p. 1-32.
A. Sajassi et al., "Virtual Private LAN Service (VPLS) Interoperability with Customer Edge (CE) Bridges." Internet Engineering Task Force (IETF), Request for Comments: 6246. Category: Informational. ISSN: 2070-1721. Jun. 2011. p. 1-20.
A. Sajassi et al., "VPLS Interoperability with Provider Backbone Bridges draft-ietf-l2vpn-pbb-vpls-interop-06." Internet-Draft. L2VPN Working Group, Intended Status: Informational. Expires: Apr. 21, 2014. p. 1-26.
F. Balus et al., "Extensions to VPLS PE model for Provider Backbone Bridging draft-ietf-l2vpn-pbb-vpls-pe-model-07.txt." Internet-Draft. Intended Status: Informational. Expires: Dec. 15, 2013. p. 1-14.
Z. Liu et al., "Redundancy provisioning for VPLS Inter-domain draft-ietf-l2vpn-vpls-inter-domain-redundancy-02." Networking Working Group, Internet-Draft. Intended Status: BCP. Expires: Jan. 13, 2014. p. 1-10.
N. Bitar et al., "NVO3 Data Plane Requirements draft-ietf-nvo3-dataplane-requirements-01.txt." Internet Engineering Task Force, Internet-Draft. Intended status: Informational. Expires: Jan. 2014. p. 1-19.
M. Lasserre et al., "Framework for DC Network Virtualization draft-ietf-nvo3-framework-03.txt." Internet Engineering Task Force, Internet-Draft. Intended status: Informational. Expires: Jan. 2014. p. 1-25.
T. Narten et al., "Problem Statement: Overlays for Network Virtualization draft-ieft-nvo3-overlay-problem-statement-04." Internet Engineering Task Force, Internet-Draft. Intended status: Informational. Expires: Feb. 1, 2014. p. 1-24.
S. Yasukawa, "Signaling Requirements for Point-to-Multipoint Traffic-Engineered MPLS Label Switched Paths (LSPs)." Network Working Group, Request for Comments: 4461. Category: Informational. Apr. 2006. p. 1-30.
R. Aggarwal et al., "Extensions to Resource Reservation Protocol—Traffic Engineering (RSVP-TE) for Point-to-Multipoint TE Label Switched Paths (LSPs)." Network Working Group, Request for Comments: 4875. Category: Standards Track. May 2007. p. 1-53.
A. Farrel et al., "A Path Computation Element (PCE)-Based Architecture." Network Working Group, Request for Comments: 4655. Category: Informational. Aug. 2006. p. 1-40.
J. Ash et al., "Path Computation Element (PCE) Communication Protocol Generic Requirements." Network Working Group, Request for Comments: 4657. Category: Informational. Sep. 2006. p. 1-21.

\* cited by examiner

METHOD FOR RESOURCE OPTIMIZED NETWORK VIRTUALIZATION OVERLAY TRANSPORT IN VIRTUALIZED DATA CENTER ENVIRONMENTS

BACKGROUND OF THE INVENTION

1. Field of the Invention

This invention relates in general to the field of communications and, more particularly, to a method for communication over virtual networks.

2. Description of the Related Art

The advent of cloud-based computing has led to development of many virtualization technologies. One such technology relates to server virtualization. This provides customer with a virtual network that is customer-configurable and can be changed by altering virtual routers and virtual switches without any change in hardware.

Various such technologies are in use, for example VX-LAN (Virtual Extensible LAN) that allows multiple virtual machines to connect with each other. The data packets in such technologies may be transferred between the virtual machines via multiple layers of the OSI model, including, L2 (Layer-2, i.e. Link Layer), L3 (Layer-3, i.e. Network Layer). Further, the virtual L2 networks' packets may be transported over the existing L3 network, without requiring any changes to the L3 network using methods such as VX-LAN. However, a few problems still exist while managing connections between the virtual machines using methods such as VX-LAN.

During transfer of packets, the packets being transferred are encapsulated with a VNI (VX-LAN Network Identifier). For example, it may encapsulate the packet with a DMAC (Destination MAC address), a SMAC (Source MAC address), and a VNI if it is layer 2 or in case of Layer 3, encapsulate the actual packet with a DIP (Destination IP address), a SIP (Source IP address), and UDP (User Datagram Protocol).

In both cases, the COS (Class of Service) value is completely encapsulated. The same kind of encapsulation is also done for DSCP (Differentiated services code point) and TTL (Time to Live) values of Layer 3.

However, since most of the virtualized servers are supposed to provide zero loss, it is necessary to inherit the actual COS and TTL value in the encapsulated header, which is not possible if they are encapsulated.

Also, there are also no provisions to trace or identify VX-LAN data path or nodes where there might be faults and accordingly diagnose any broken connections.

According to the foregoing discussion, it can be observed that the existing methods and mechanisms used are inadequate to ensure high performance, better reliability of the VX-LAN systems. In light of this, therefore, there is a need for an improved method which overcomes some or all of the limitations identified above.

ACRONYMS AND ABBREVIATIONS

This invention uses the following list of terminologies in the context of describing data center's virtualized transport, virtual machine provisioning & management, and virtual network resource optimization for transport path computation.

ARMA—Auto Regressive Moving Average
ASON—Automatic Switched Optical Network
BCB—Backbone Core Bridge
BEB—Backbone Edge Bridge
BFD—Bidirectional Forwarding Detection
BRPC—Backward Recursive Path Computation
BSS—Business Support System
CFM—Connectivity Fault Management
COS—Class of Service
CPU—Central Processing Unit
CUG—Closed User Group
DC—Data Center
DREMCD—DC resource utilization efficiency Management Capability Descriptor
ECMP—Equal Cost Multiple Paths
EMS—Element Management System
EWMA—Exponential Weighted Moving Average
GRE—Generic Routing Encapsulation
IETF—Internet Engineering Task Force
IS-IS—Intermediate System to Intermediate System
LSA—Link State Advertisement
LSP—Link State Packet
LDREF—Link Level DC resource utilization efficiency Factor
MAC—Media Access Control
MPLS—Multi-Protocol Label Switching
GMPLS—Generalized Multi-Protocol Label Switching
MPLS LSP—MPLS Label Switched Path
NDREF—Node Level DC resource utilization efficiency Factor
NMS—Network Management System
NVE—Network Virtualization Edge
NVO—Network Virtualization Overlay
NVU—Network Virtualization Underlay
OAM—Operations Administration and Management
OSPF—Open Shortest Path First
OSS—Operations Support System
PBB—Provider Backbone Bridging
PCE—Path Computation Engine
PLDREI—Percentage Link Level DC resource utilization efficiency Indicator
PNDREI—Percentage Node Level DC resource utilization efficiency Indicator
PWE3—Pseudowire Emulation End-to-End
QoS—Quality of Service
SDN—Software Defined Network
SPB—Shortest Path Bridging
STP—Spanning Tree Protocol
MSTP—Multiple Spanning Tree Protocol
RSTP—Rapid Spanning Tree Protocol
TES—Tenant End System
TLV—Type, Length and Value
TRILL—Transparent Interconnection of Lots of Links
TTL—Time To Live
VAP—Virtual Access Point
VM—Virtual Machine
VPLS—Virtual Private LAN System
H-VPLS—Hierarchical VPLS
VCCV—Virtual Circuit Connectivity Verification
VN—Virtual Network
VNI—Virtual Network Interface
VNID—Virtual Network Identifier
VPN—Virtual Private Network
VS—Virtual Switch
VSI—Virtual Station Interface

SUMMARY

In some exemplary embodiments of the present invention, a method of transferring a data packet from a first virtual machine to a second virtual machine in a virtualized network is provided. The method includes the step of generating the data packet at the first virtual machine and encapsulating the data packet. Further, the encapsulated data packet is provided with a header, such that the header includes either the inherent COS and TTL values of the data packet from the first virtual machine or user-defined COS and TTL values. Thereafter, the encapsulated data packet is transmitted to the second virtual machine via at least one network switch.

In some exemplary embodiments of the present invention, a method of determining a communications path between a first virtual machine and a second virtual machine in a virtualized network is provided. The method includes the step of generating a first data packet at the first virtual machine, encapsulating the first data packet and providing a header to the encapsulated first data packet, such that the header includes at least a destination address and a user defined TTL (Time to Live) value. In an embodiment, the initial TTL value can be set to one. Thereafter, the encapsulated first data packet is transmitted and an acknowledgement of receipt of the first data packet from a node is received. Based on this acknowledgement, a status of delivery of the first data packet is determined and subsequent data packets are sent from the first virtual machine. The subsequent data packets are identical to the first data packet and differing in TTL values that are successively incremented by a pre-defined number. This enables the invention to trace all successive nodes in the communications path between the first virtual machine and the second virtual machine.

In some exemplary embodiments of the present invention, a system that enables implementation of BFD (Bidirectional Forwarding Determination) protocol on virtual networks like VX-LAN to identify and diagnose faulty nodes is provided.

In some exemplary embodiments of the present invention, a system that extends the Network Virtualization Overlay (NVO) framework defined by IETF by introducing an optimized virtualized transport mechanism is provided.

In some exemplary embodiments of the present invention, a system to carry data center tenant system's LAN or WAN traffic using MPLS-TP Tunnels (VTPX-LWAN) is provided.

In some exemplary embodiments of the present invention, a system that provides carrier grade Traffic Engineering, QoS, Protection/Resiliency, Fault Monitoring and Fault repair service for the proposed VTPX-LWAN based transport, since those characteristics can be inherited based on IETF defined characteristics of MPLS-TP Transport is described.

In some exemplary embodiments of the present invention, a system that extends the Virtual Machine (VM) management framework of Data Center by introducing a Path Computation Server (PCE) architectural element is provided.

In some exemplary embodiments of the present invention, a system to compute optimal placement of a new VM creation to specific data center and the server is provided.

In some exemplary embodiments of the present invention, a method for optimal placement will ensure that the VM's operator defined policies are optimally satisfied, w.r.t. the current availability of network and server resources in an inter-connected set of data centers is provided.

In some exemplary embodiments of the present invention, a system that extends the VM management framework to include the scenarios of Graceful Shutdown and Graceful restart of VM is provided.

In some exemplary embodiments of the present invention, a VPLS based alternate NVO overlay control plane system using MPLS-TP Tunnels as virtualized transport systems is provided.

In some exemplary embodiments of the present invention, a system that complements the virtualized data center transport service 'VX-LAN' as defined by the IETF draft, by incorporating support for QoS, and OAM tools is provided.

One aspect of the invention includes a mechanism of monitoring resource utilization by various group of VMs against the hosting servers/hypervisors inside the DC network.

According to another aspect of the invention, a PCE based path computation framework 'VDC-PCE' is introduced in the VDC architecture, that will listen to the VM's resource utilization summary from Server/Hypervisor and maintain the up-to-date resource database.

According to another aspect of the invention, a VM controller functionality is introduced as an architectural element into the VDC architecture. The VM controller may service the VM create, delete and relocate service requests coming from the management system, by utilizing the algorithmic computation services of VDC-PCE, to find the optimal placement of a new VM or optimal re-routing of an existing VM. The VDC-PCE may dynamically map the resource utilization status of various Servers present in the local DC network based on status received from VDC-Monitor. The VDC-PCE may run policy constraint combinatorial optimization algorithms to find a free VM slot on a server that will satisfy the policy constraints optimally.

One aspect of the invention includes a mechanism to transport VM user's traffic across the Network Virtualization Overlay (NVO), using MPLS-TP Tunnels. The MPLS-TP Tunnels can be instantiated based on the Virtual Network context and Virtual Network ID to transport VM users traffic that belong to the NVO, across intra-DC and inter-DC networks.

One aspect of the invention includes a NVO Control Plane based on VPLS that will make use of optimal MPLS-TP transport tunnel services on a per Virtual Network Instance basis.

One aspect of the invention includes a complementary enhancement to the IETF's draft proposal of virtualized transport mechanism 'VX-LAN' to enable QoS guaranteed packet transport.

One aspect of the invention includes a method to inherit the COS or DSCP and TTL value from CE (actual packet which is getting encapsulated) since o The CoS mapping behavior for the CE VLAN is not explicitly specified in the case of VX-LAN transport. In this case, the COS value which resides inside the CE VLAN is completely encapsulated and outer VLAN tag may be and may not available or may be given with the lower or upper COS value than inner COS. The same kind of encapsulation can be also done layer for Layer 3 DSCP and TTL value. This will allow the user to set the COS and TTL policies for VX-LAN network. Based on the configuration the COS and TTL values may be set to the outer header (encapsulation header) from the actual packet (CE packet). If the user wants to assign the different COS and TTL values for outer header then those new values may be applied irrespective of the actual packet COS and TTL. If the user wants to inherit the inner COS and TTL values then during the encapsulation those values may be copied to outer header.

Another aspect of the invention provides a method that may allow data path fault monitoring and fault reporting of IETF's draft standard VX-LAN transport mechanism. The data path fault monitoring and fault reporting is not explicitly standardized for VX-LAN transport. The method (VX-LAN-BFD) may include monitoring the fault using BFD protocol between two VM(s) when they are connected through the VX-LAN aware network. The VX-LAN-BFD may allow the user to monitor the data path and generate the fault when the path is broken in the VX-LAN network. IETF recent proposal submitted for VX-LAN ping (incorporated herein by reference) describes the ping and need for VX-LAN ping. The draft will not have any fault monitoring protocol which periodically validates the path. This method may be very useful when VX-LAN is implemented through EVPN, GRE to diagnose the current path. This may be used incorporated to any automation monitoring tool or dynamic signaling protocol when the data center network implemented through the VX-LAN Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
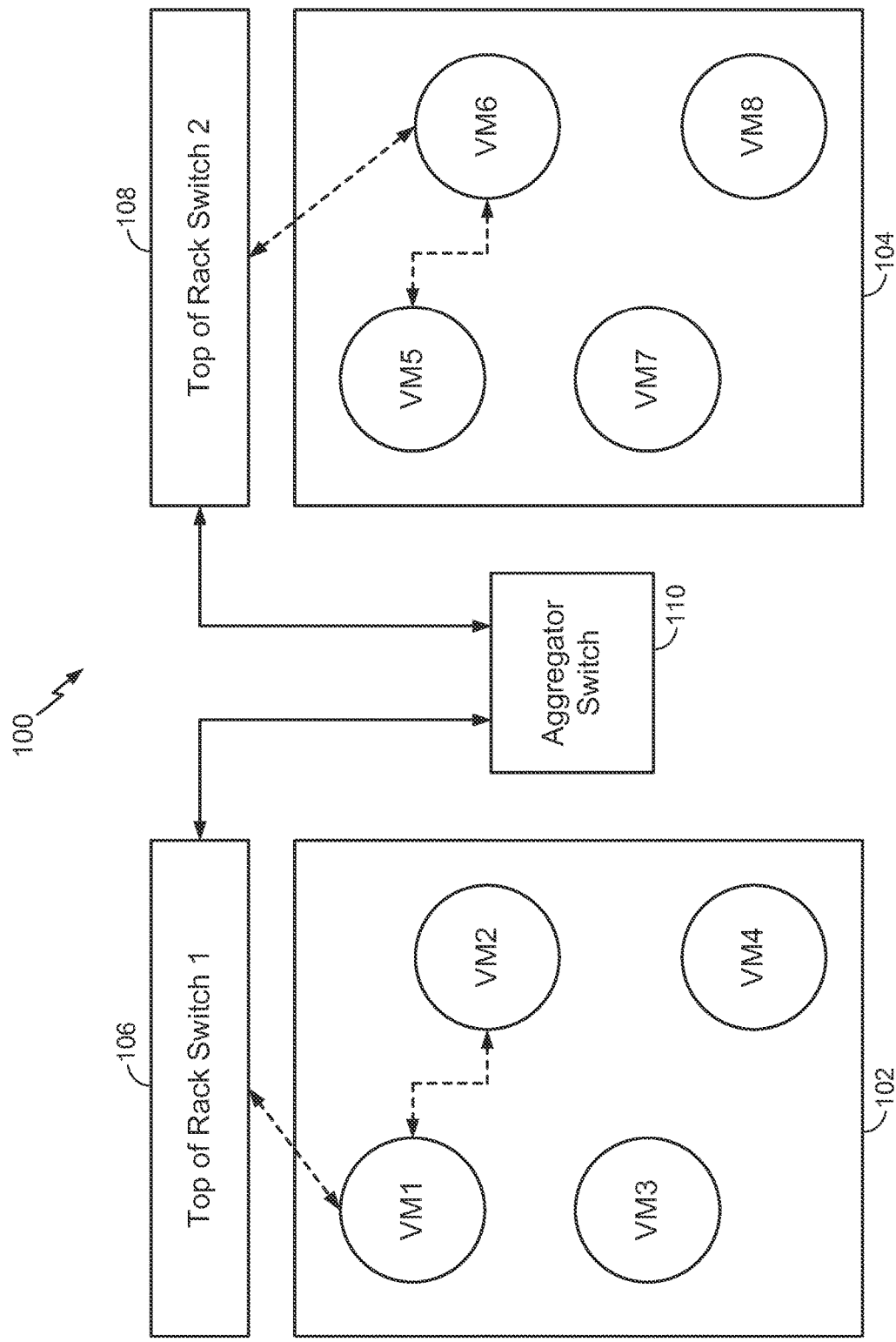
FIG. 1 illustrates an exemplary virtual network system, in accordance with various embodiments of the present invention.

The various embodiments of the invention are described hereinafter with reference to the accompanying drawings, in which embodiments of the invention are shown. However, the various embodiments may be embodied in many different forms and should not be construed as limited to the embodiments set forth herein. Rather, these embodiments are provided to illustrate various aspects of the invention.

Aspects of embodiments of the invention are disclosed in the following description and related drawings directed to specific embodiments of the invention. Alternate embodiments may be devised without departing from the scope of the invention. Additionally, well known elements of the invention will not be described in detail or will be omitted so as not to obscure the relevant details of embodiments of the invention. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Referring now to the drawings, FIG. 1 illustrates an exemplary virtual network system 100, in accordance with some embodiments of the present invention.

Servers usually include a local network that can be configured to support traffic/flows associated with one or more virtual LANs (VLAN). VLANs are typically employed to segregate traffic from different entities in order to improve performance However, number of VLANs are currently limited 4080 separate VLANs and as the volume of traffic increases, it is necessary to upgrade the network's capacity to process the increased traffic. Hence, to improve and upgrade a network to more efficiently support larger volumes of traffic network virtualization (NV) has been proposed as a methodology to use. Network virtualization methods can extend the capacity of a network to support many "virtual networks", and each virtual network can be utilized to support traffic associated with one or more entity.

One such network virtualization technique is described in a Network Working Group Internet Draft entitled "VXLAN: A Framework for Overlaying Virtualized Layer 2 Networks over Layer 3 Networks", the entire contents of which are incorporated herein by reference. This VXLAN technology can be implemented within a local network, such as a data center.

Moving on, FIG. 1 illustrates a simple data center 100 comprising two rack servers 102 and 104. It should be appreciated that a data center can include hundreds of rack servers connected to each other. However, for the purpose of explaining the environment of the invention the description will make use of only two rack servers 102 and 104. Each rack server 102 and 104 can be configured to support some number of virtual machines (VM) as illustrated by VM1 to VM8 in the figure. Note that the rack servers are VX-LAN capable servers.

In data centers like data center 100, each rack server may run in different Layer 2 segments and in such cases VMs can't communicate with other VMs running in other Layer 2 segments unless there is VX-LAN, which will let the VMs transfer data packets to other Layer 2 segments.

This is further illustrated in the figure, which is shown to include one or more switches, such as the aggregator switch 110, linked to two top-of-rack (TOR) switches 106 and 108, each of which are in turn linked to the servers 102 and 104. The switches generally operate to receive data packets from a neighboring device and forward the data packets to their destination, whether the destination is a server or another switch.

For example, when VM1 running on the server 102, generates a data packet for transmission to VM6 running on the server 104, then the connection is set up via the TOR switch1 106, the aggregator switch 110 and the TOR switch2 108.

It should be appreciated that even though the above has been described with reference to VX-LAN, this invention can be implemented on other similar communications network, such as a Layer 2 overlay scheme provisioned over a Layer 3 network. Examples of such networks can include, but are not limited to, Virtual extensible Local Area Network (VX-LAN), Network Virtualization Generic Routing Encapsulation (NV-GRE), media access control (MAC)-in-MAC, etc.

Figure 2:
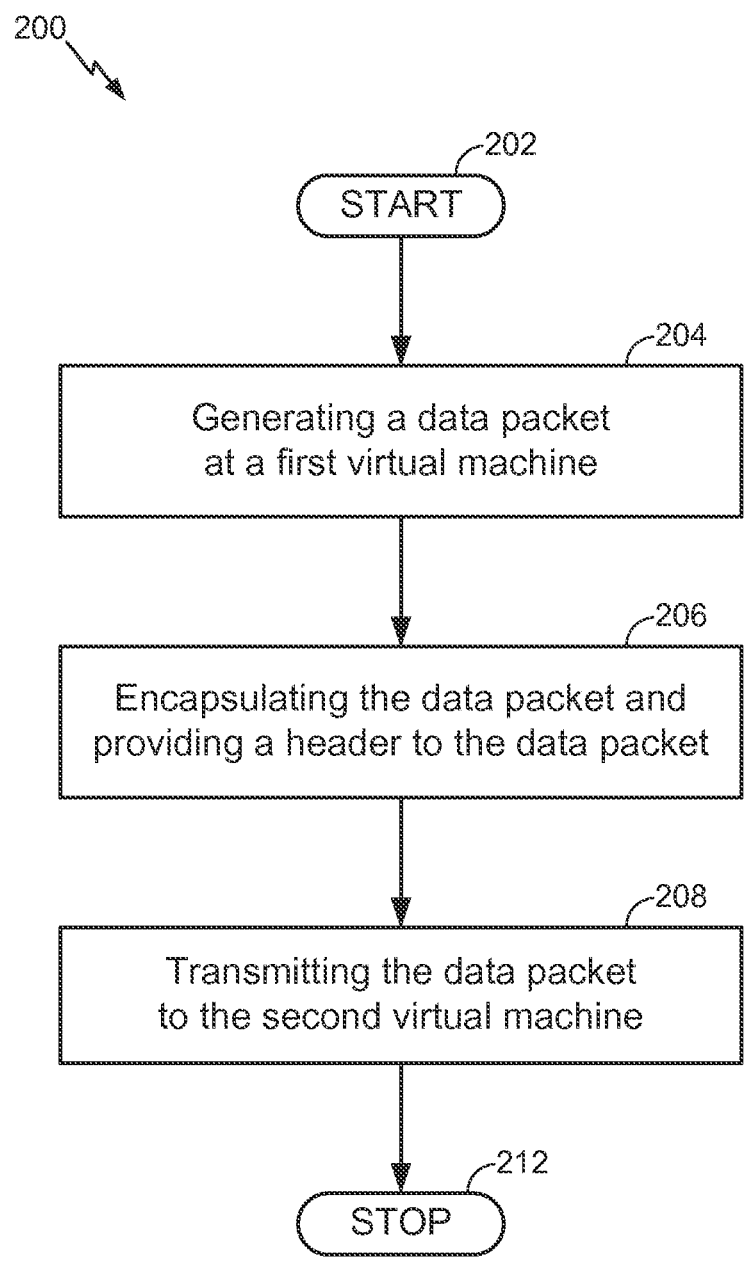
FIG. 2 is a flow chart describing a method of transferring a data packet from a first virtual machine to a second virtual machine in a virtualized network, in accordance with various embodiments of the present invention.

Referring to FIG. 2, a method to transfer data from a first virtual machine to a second virtual machine, in accordance with an embodiment of the invention, is described. To describe FIG. 2, reference will be made to FIG. 1, although it is understood that the method 200 can be implemented in any other suitable system. Moreover, the invention is not limited to the order in which the steps are listed in the method 200. In addition, the method 200 can contain a greater or fewer numbers of steps than those shown in the FIG. 2.

The method 200 is initiated at step 202. Thereafter at step 204 a data packet is generated by a first virtual machine, for example VM1, to be transmitted to a second virtual machine VM6.

At step 206, VX-LAN will allow the data packets to move between the virtual machines by encapsulating the data packets and providing it with a header and VNI (VX-LAN Network Identifier). The data packet is encapsulated and the invention allows the header to either have user-defined COS and TTL policies for the transmission of the encapsulated data packet or the user can choose to inherit the inner COS and TTL values as generated when the data packet is generated at step 204.

The invention enables the user to assign different COS and TTL values for the header and they may be applied irrespective of the actual packet COS and TTL values. Further, it also allows retaining COS and TTL values for any data packet during the VX-LAN encapsulation.

Thereafter, the encapsulated data packet is transmitted as per the chosen COS and TTL values via desired traffic class or queue even though the packet is completely encapsulated over VX-LAN to the second virtual machine via one or more switches as required.

One of the advantages of the method of the present invention is that it extends the existing VX-LAN protocols and classifies the data packets based on the COS and TTL values from the actual source (VM). Furthermore, the method of the present invention is compatible with the existing VX-LAN because and addresses one of the drawbacks of actual VX-LAN proposal. Also, the method of the invention does not add any additional scaling or performance overhead as any extra processing required. Further, the invention also does not impose any additional security threats, since it does not introduce any new field in the data packet and just updates the header.

In an embodiment, the method also enables implementation of conjunction control mechanism over VX-LAN.

Figure 3:
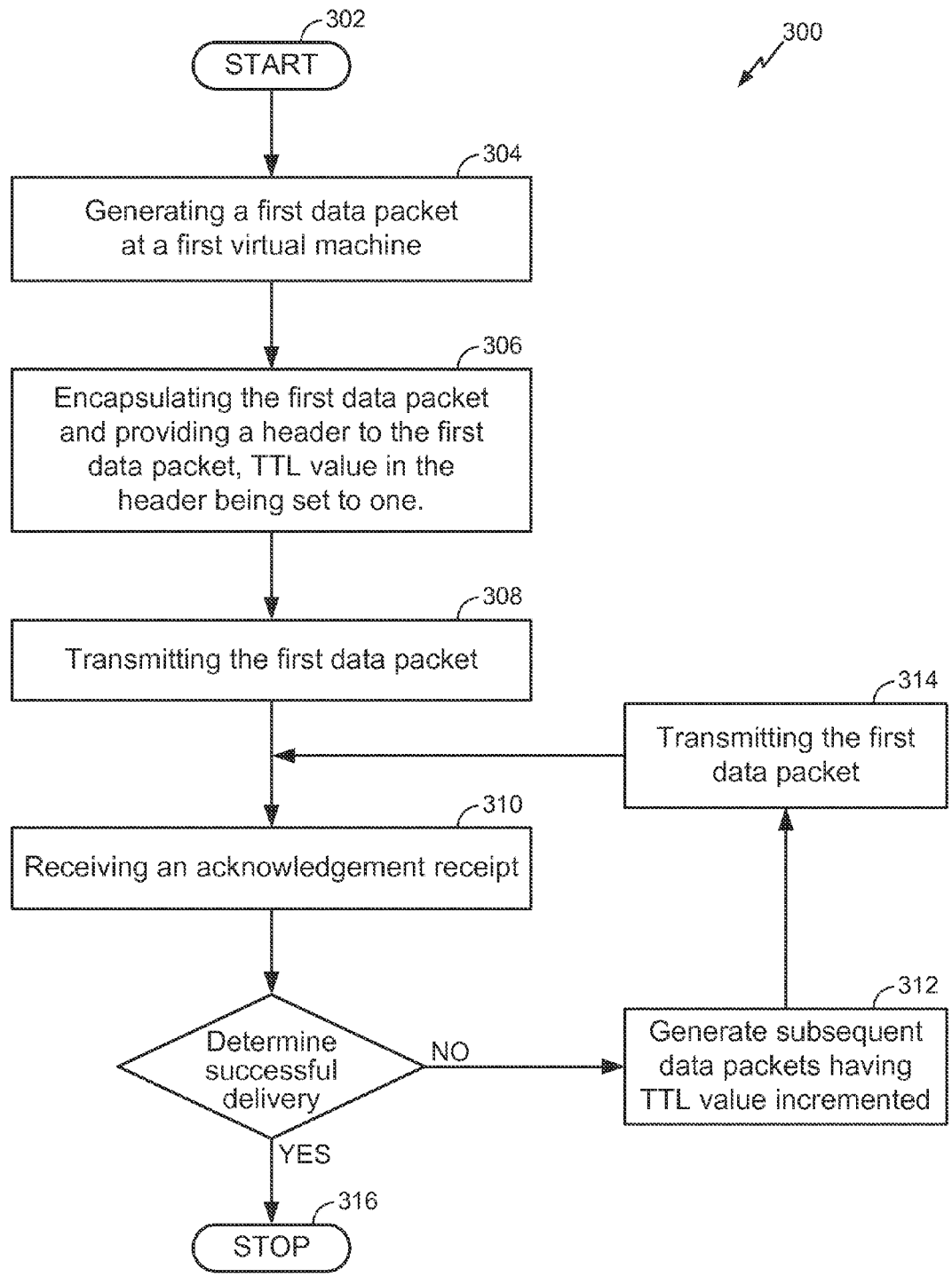
FIG. 3 is a flow chart describing a method of determining a communications path between a first virtual machine and a second virtual machine in a virtualized network, in accordance with various embodiments of the present invention.

Moving on to FIG. 3, a method to determine a communications path between a first virtual machine and a second virtual machine, in accordance with an embodiment of the invention, is described. To describe FIG. 3, reference will be made to FIG. 1 and FIG. 2, although it is understood that the method 300 can be implemented in any other suitable system. Moreover, the invention is not limited to the order in which the steps are listed in the method 300. In addition, the method 300 can contain a greater or fewer numbers of steps than those shown in the FIG. 3.

The method 300 is initiated at step 302. Thereafter at step 304 a first data packet is generated by a first virtual machine, for example VM1.

At step 306, the data packets are encapsulated and provided with a header and a VNI (VX-LAN Network Identifier). As per the invention the header includes a user-defined COS and TTL values wherein the TTL value is initially set at one.

Thereafter, at step 308 the data packet is transferred as per the set COS and TTL values. At step 310, an acknowledgement receipt is received from a node at which the data packet is received as per the COS and TTL values set. A "node" as mentioned here may be any electronic device, client, server, peer, service, application, VM, or any other object capable of sending, receiving, or forwarding information over a communications path in a network.

Thereafter, at step 312, a determination is done to check if the node sending the acknowledgement receipt is the second virtual machine or not. If it is determined that the node is not the second virtual machine VM6, then the first virtual machine can generate a subsequent data packet at step 314, the subsequent data packet is identical to the first data packet except for the TTL value in the header being incremented by a predefined number like one. Thereafter, the subsequent data packet is transmitted at step 316 and the step 310 and 312 are repeated until the node sending acknowledgement receipt is determined to be the second virtual machine. This enables the method to find all successive nodes on the communications path until a destination is reached enabling tracking of the entire communications path in a VXLAN network.

Thereafter the method is terminated at step 318.

One method according to an aspect of the present invention enables the user to diagnose any fault in the data communication path and isolate the particular node or particular link in the VX-LAN network. This determination of the route is also useful in cases where multiple technologies may share the VX-LAN network. Furthermore, the method enables use of regular trace route protocol (using incremental TTL mechanism) for on the VX-LAN trace route. Also, this method of the invention does not add any additional scaling or performance overhead as any extra processing required. Further, this aspect also does not impose any additional security threats, since it does not introduce any new field in the data packet and just updates the header.

Figure 4A:
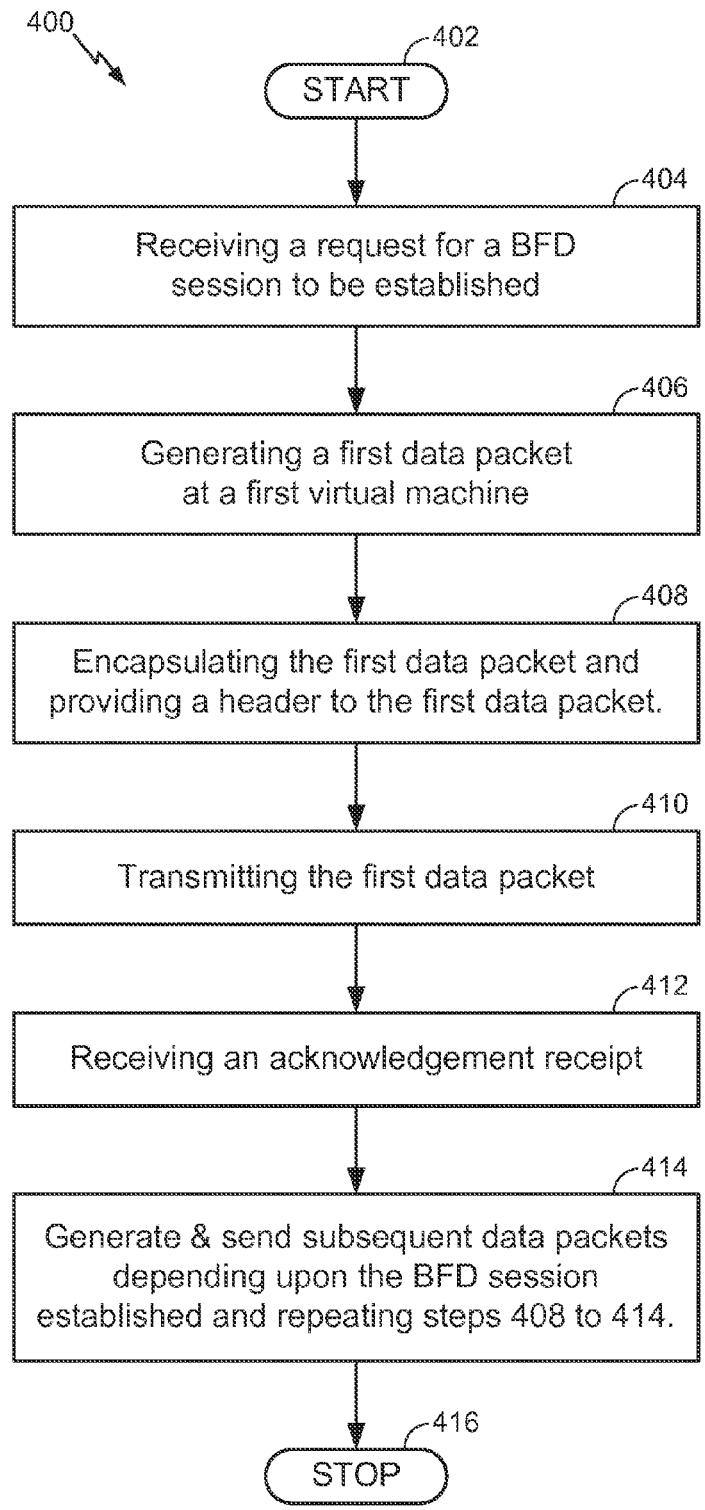
FIG. 4A is a flow chart describing a method to determine and monitor any faults between a first virtual machine and a second virtual machine, in accordance with various embodiments of the present invention.

Moving on to FIG. 4A, a method to determine and monitor any faults between a first virtual machine and a second virtual machine, in accordance with an embodiment of the invention, is described. To describe FIG. 4A, reference will be made to FIG. 1, FIG. 2 and FIG. 3, although it is understood that the method 400 can be implemented in any other suitable system. Moreover, the invention is not limited to the order in which the steps are listed in the method 400. In addition, the method 400 can contain a greater or fewer numbers of steps than those shown in the FIG. 4A.

The method 400 is initiated at step 402. Thereafter at step 404, a request for a Bidirectional Forwarding Detection (BFD) session to be established is received at a second virtual machine, for example VM6 from a first virtual machine, for example VM1. A BFD session is established by a simple Hello protocol, for example by implementing a three-way handshake.

Thereafter, upon receipt of confirmation from the second virtual machine, a first data packet is generated by the first virtual machine, at step 406.

At step 408, the data packet is encapsulated and provided with a header and a VNI (VX-LAN Network Identifier). As per the invention the header can include a user-defined alert bit.

Thereafter, at step 410 the data packet is transferred as per the BFD link established. At step 412, an acknowledgement receipt is received from the second virtual machine at which the data packet is received.

Thereafter, at step 414, a subsequent data packet may be generated and transmitted as described in steps 408 to 412 above. A pair of systems may transmit BFD packets periodically over each path between the two systems, and if a system stops receiving BFD packets for long enough time, some component in that particular bidirectional path to the neighboring system is assumed to have failed. It is to be understood that path is only declared to be operational when two-way communication has been established between the two systems.

Thereafter the method is terminated at step 416.

In an embodiment, each virtual machine can estimates how quickly it can send and receive BFD packets in order to come to an agreement with its neighbor about how rapidly detection of failure needs to take place. These estimates can be modified in real time in order to adapt to unusual situations. This design also allows for fast systems on a shared medium with a slow system to be able to more rapidly detect failures between the fast systems while allowing the slow system to participate to the best of its ability.

In another embodiment, a BFD session may be established based on the needs of the application that will be making use of it. It is up to the application to determine the need for BFD.

Further, it should be appreciated that the BFD can have two operating modes that may be selected—Asynchronous mode or Demand mode.

In an asynchronous mode the systems periodically send BFD Control packets to one another, and if a number of those packets in a row are not received by the other system, the session is declared to be down.

In a demand mode it is assumed that a system has an independent way of verifying that it has connectivity to the other system. Once a BFD session is established, such a system may ask the other system to stop sending BFD packets, except when the system feels the need to verify connectivity explicitly, in which case a sequence of BFD packets may be exchanged.

Other states that are available based on this system other than Down state are Up state (When the packet received from it is partner within the interval time), Init state (in case the protocol enabled initial packet sent it to any other end point) and AdminDown state (in case user has disabled the BFD session).

Further, it should be appreciated that the BFD method described above allows various kind of authentication mechanism which can be used over VX-LAN and VX-LAN.

Note that the technique as defined above takes reference from Internet Engineering Task Force (IETF) draft entitled "Bidirectional Forwarding Detection (BFD)" ISSN no. 2070-1721, the entire contents of which are incorporated herein by reference.

Figure 4B:
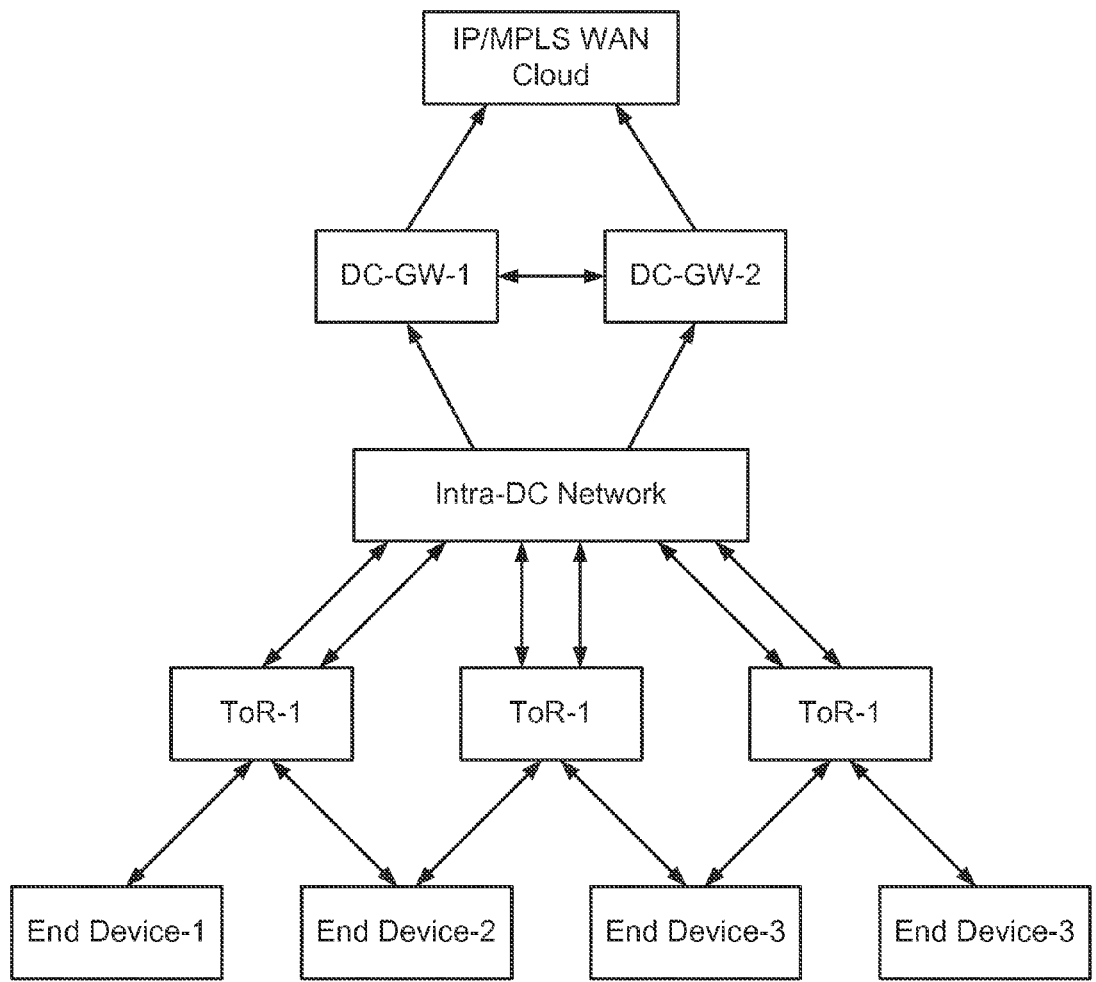
FIG. 4B is a schematic chart describing an data center network architecture in accordance with various embodiments of the present invention.
Figure 4C:
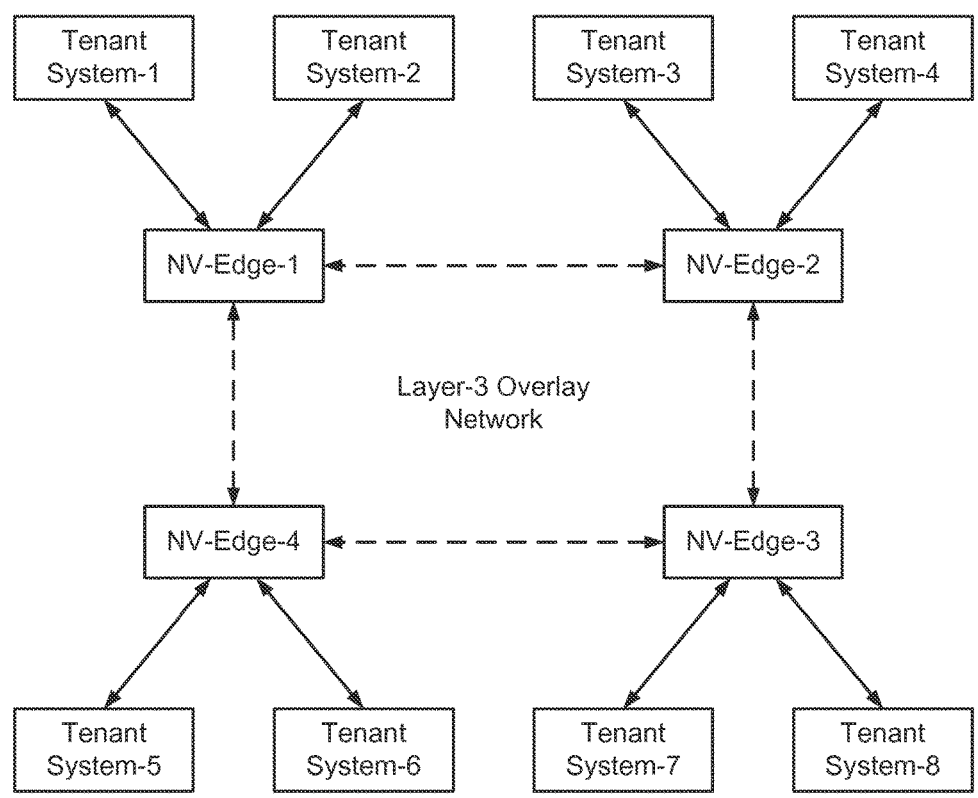
FIG. 4C is a schematic chart describing a data center network virtualization overlay architecture in accordance with various embodiments of the present invention.

Further exemplary embodiments of the present invention will be described and should be read in conjunction with FIGS. 4B and 4C. The diagrams show a reference model for the DC network virtualization overlay architecture, consisting of 'Network Virtualization Edge' nodes and Tenant System(s).

Network virtualization Edge (NVE)—These are usually Top-of-Rack (ToR) switches in the Data Center (DC) which provide virtualized transport of Tenant System's traffic inside data center and across the inter-connected data centers. The NVE(s) can be also responsible coordinating the VM management activities (VM Create, Terminate, Modify, Relocate) with the Server/Hypervisor inside the local data center as well as across remote data center(s).

Inside DC network, the VMs are usually hosted by Server machines which are connected to the ToR switches in the DC. A DC may have multiple ToR switches and a ToR switch may be connected to Servers via 'External Bridge Port Extenders (IEEE 802.1BR). In this configuration ToR switch is the controlling Bridge.

The NVE(s) facilitate communication of VM(s) within a data center and also across data centers. When the NVE(s) are not resident inside the Hypervisors, they are usually part of ToR switch.

VX UC-L2-CUG—A group of VM(s) identified by a configured policy who can communicate among themselves over a VLAN across the NVO. The communication among the VM(s) in that group is accomplished in such a way that MAC source and destination addresses in the Ethernet headers of the packets exchanged, among the VM(s) are preserved. Such groups of VMs are referred as Layer 2 Closed User Group L2-CUG.

A VM may be member of more than one L2-CUG(s). In a L2-CUG, all the VM(s) will have their IP addresses assigned from a single IP prefix.

When a VM is a member of multiple L2-CUG(s), [e.g. L2-CUG-1, L2-CUG-2, . . . L2-CUG-N] it will be assigned multiple IP addresses and multiple logical interfaces, i.e. one IP address and one Logical interface for each L2-CUG.

VX UC-L3-CUG—When the VMs can communicate in a L3 domain, using IP forwarding, they form a L3 Closed User group (L3-CUG).

VX MC-L2-CUG—When a group of VMs can exchange L2 multicast packets among themselves, they form a L2 multicast closed user group (MC-L2-CUG). The VMs in a MC-L2-CUG may be located on the same server or different servers in a single data center network, or different servers across multiple data center networks.

VX MC-L3-CUG—When a group of VMs can exchange L3 multicast packets among themselves, they form a L3 multicast closed user group (MC-L3-CUG). The VMs in a MC-L3-CUG may be located on the same server or different servers in a single data center network, or different servers across multiple data center networks.

VX AC-L2-CUG—When a group of VMs can exchange any of L2 uni-cast, L2 multicast or L2 broadcast packets among themselves, they form a L2 any-cast closed user group (AC-L2-CUG).

VX AC-L3-CUG—When a group of VMs can exchange any of L3 uni-cast, L3 multicast or L3 broadcast packets among themselves, they form a L3 any-cast closed user group (AC-L3-CUG).

L2-PHY-DOM—In a data center a Server machine belongs to a physical L2 domain. A group of interconnected devices, that can communicate by exchanging Ethernet packets and are located in a single data center network, represent a L2 Physical domain (L2-PHY-DOM).

When a server of a L2-PHY-DOM hosts one or more VMs, the VMs may be part of multiple L2-CUG(s), which span across multiple data center(s).

An L2-PHY-DOM contains a VM, if the server hosting the VM belongs to that domain or is connected to a ToR switch, that is part of that domain in a data center network.

An L2-CUG is considered present in a data center, if one or more VMs of that L2-CUG is hosted by Servers which are present in that data center network.

L2-DOM-PARTITION—When a L2-PHY-DOM in a data center network contains one or more VMs which are member of multiple different L2-CUG(s), the address separation and traffic isolation across the L2-CUG(s) are maintained using VLANs.

The VLANs assigned to L2-CUG(s) facilitate per CUG traffic forwarding, MAC learning and aging etc.

Virtualized Transport of Server Traffic through NVO will now be described according to various aspects of the invention. Recently there has been increasing demand in data center networks, to provide per customer basis, isolated and separated services, using server virtualization. The server virtualization technology facilitates such services using Virtual Machines (VM). With the tremendous growth of VM users in data centers, the Ethernet switched networks will be required to support several thousands of MAC addresses and VLANs for the VM users.

The legacy model of communication among the VM users are using L2 physical network or using VLAN flood domain over the physical L2 network. In the L2 model of communication a 12-Bit VLAN ID is used in the Ethernet data frame to divide the Layer-2 network into multiple broadcast domains for broadcast traffic isolation.

The VLAN limit is only 4096 and can serve only smaller data centers which require fewer than 4094 VLANs. However with the growing need of supporting several hundred of thousands of VM(s) in data centers, simple VLAN based service identification is not enough in the data centers.

Since VM users intend to run applications for computation and storage services by communicating with other VMs in the same or across data centers, a per tenant or per L2-domain virtualized extension of the broadcast domain becomes necessary. Extending VM user's L2 domain across data centers using legacy Spanning Tree protocols, e.g. STP, RSTP or MSTP has the drawback of not utilizing all the available paths through the network, resulting in wastage of bandwidth. Also data center service providers may allow tenant systems to assign VLAN-IDs and MAC addresses for their VMs independent of other tenants. This may result in duplicate VLAN-ID and MAC addresses, in a physical data center network with multiple tenants.

Though the newer L2 protocol mechanisms such as TRILL or Shortest Path Bridging (IEEE SPB), address the single Link limitation of xSTP, by allowing multi-path usage, however overlapping VLAN-ID and MAC address usage by multiple.

In data centers tenant systems can also be communicating using L3 networks, when the individual VMs of the tenant system has IP addresses assigned. Also in the Top-of-Rack (ToR) switches which connect the servers hosting VMs in data centers, there is a growing demand for MAC address learning capabilities, since the ToR switch has to learn individual MAC addresses of several VMs that are hosted by the servers.

Since a ToR switch typically may connect 'N' number of servers, with 'M' number of VMs per server, (with N=50, M=100), number of MAC address it has to learn grows continuously (N×M) with virtualizations, which becomes a physical limitation for the ToR switches. In either scenarios, L2-domain or L3-domain based tenant system communication, network traffic should be isolated and several tenant systems should be able to co-exist and operate independently in a single or multiple inter-connected data centers.

One aspect of this invention includes a virtualized transport method that would allow multiple tenant system's traffic to be transported in an isolated and separated manner among virtualized servers in the same or different data center networks. Under the new virtualized transport mechanism, the individual VMs of different tenants systems would be unaware of the virtualized transport tunnels.

The individual VMs would still be able to communicate transparently, within their VLAN flood domain, i.e. L2-CUG, or L3-CUG when they have IP addresses assigned.

In further exemplary embodiments of the present invention, the invention also provides a complementary enhancement to the virtualized transport mechanisms 'VX-LAN' to enable QoS guaranteed packet transport. An alternate Virtualized Transport mechanism based on Bi-Directional MPLS-TP Tunnel is provided by the invention.

For example, a virtualized transport of server traffic using NVO-MPLS-TP-VXTS will now be described. Native L2 or L3 physical communication domains for VM users may be extended using a virtualized transport mechanism that would run over the existing physical data center networks. Further, the virtualized extended transport system (VXTS) would allow tenant systems to communicate seamlessly across multiple inter-connected data centers without being aware of the separation of data center boundaries, but still remaining within their L2 or L3 domain of existences.

Also to enable the virtualized extension of L2 or L3 domains, a 20-bit virtual network extension identifier (VNX-ID) may be used to distinguish among the different extended virtual network domains (XVND). The choice of a 20-bit VNX-ID is a result of using MPLS-TP Tunnel based virtualized transport. Also, the MPLS LSP(s) use 20-bit Label value in the encapsulation header. Thus when MPLS-TP Tunnel is used as VXTS, in data centers, the 20-bit Label value of the MPLS LSP header would be used as the virtual network identification, i.e. VNX-ID.

Each tenant system may communicate with other tenant systems within the same XVND. In data centers multiple XVNDs may be present in a single administrative domain. This VXTS mechanism therefore creates an overlay of tenant system's L2 or L3 communication domain on top of a physical shared L2 or L3 inter-connected networks. The physical shared L2 or L3 inter-connected network which is termed as underlay may not be visible to the overlay of virtualized tenant systems. Also the physical underlay network may not be aware of the co-existence of multiple different XVND's overlays. For traffic isolation and identification purposes, tenant system's packets would be encapsulated with virtual network tunneling header containing the distinguishing VNX-ID parameter.

The VXTS may represent a nested frame header encapsulation mechanism consisting of an outer L2 or L3 frame header followed by the VNX-ID parameter, which in turn is followed by the inner L2 or L3 header of the original frame of tenant system. The VXTS Tunneling end points (VXTEP) may only ne known to the switch where the network virtualization encapsulation starts of the tenant system's traffic. This will be done either at the ToR switch when the server is connected to the data center via ToR switch or at the Hypervisor of the server for VMs. In either case, the VXTEP is not known to the VMs of the tenant systems, and the individual VMs would communicate transparently without being aware of the virtual network specific encapsulation/de-capsulation that would take place at the VXTS Tunnel initiation or termination point.

Virtualized transport of uni-cast traffic through NVO-MPLS-TP-VXTS according to another aspect of the invention will now be described. In the unicast traffic flow scenario, the VXTEP end-points will use data plane source learning mechanisms, to discover the association between VXTEP's IP Address and VM's MAC address. Traffic with broadcast and unknown destination MAC addresses will be flooded as usual using MAC multicast mechanism.

Below includes details on how these data plane based learnt VXTEP IP address to VM MAC address binding (VN-IP-2-MAC) can be distributed to other VXTEP's via control plane based routing/signaling mechanisms.

Since VMs are unaware of XVND overlay, to communicate with another VM in the same L2 or L3 domain, it would send a MAC frame destined to the target VM as usual. The VXTEP will determine the VNI of the source VM and then checks if the destination VM is on the same L2-domain or L3-Domain. The VXTEP then lookups the VN-Label-2-MAC database to determine if there is a mapping of the remote VM's MAC to remote VXTEP's MPLS-TP LSP Label.

If the underlay network does not support MPLS Label switching, then VXTEP also determines the IP address of the remote VXTEP based on a VN-Label-2-IP. The local VXTEP then encapsulates the frame with an {outer MAC+ outer IP address and VXTEP header. The original MAC frame's MAC header will become the inner MAC header containing the destination MAC as the remote VM's MAC address.

The VXTS encapsulated frame is then sent to the IP address of the remote VXTEP as obtained from the VN-IP-2-MAC lookup result. The destination VXTEP upon receiving the frame determines the VNI and validates that the destination MAC of the inner header belongs to its virtual network. The destination VXTEP then learns the inner source MAC address to outer source IP address mapping and stores this mapping in its local VN-IP-2-MAC table. The destination VXTEP strips the outer encapsulation header and forwards the frame to the destination VM. When the destination VM wants to send a frame to the local VM, it will send the frame to its local VXTEP which will then use the already learnt VN-IP-2-MAC binding to determine the IP address of the target VXTEP where the frame is to be sent.

Virtualized transport of multicast traffic through NVO-MPLS-TP-VXTS will now be described according to another aspect of the invention. Depending on the type of Tennant system's communication model, i.e. L2 or L3 domain based, multicast of traffic from local VM users can be extended to a group of remote VMs which are either attached to another hypervisor in the same data center or a set of hypervisors in one or more remote data centers. In either case the multicast traffic of a L2 or L3 CUG are distributed to the VMs which are members of the specific L2 or L3 CUG only.

In the context of a virtual network of a tenant system, the multicast traffic replication is handled by the local NVE, to which the tenant systems of the local data center are connected over the Ethernet network. When there are receivers of the multicast traffic in the local data center, the local NVE replicates the multicast traffic in order to send to the local tenant system or VMs.

In order to send the multicast traffic to the tenant systems of remote data centers, the local NVE needs to find out the multicast distribution tree first. The local NVE then sends the replicated multicast traffic to NVEs of remote data centers. The remote NVEs in turn determine the tenant systems of VMs of their data centers, which are members of the multicast group in the specific virtual network context. Once the multicast members are found for the virtual network context, the remote NVE forwards the multicast traffic towards the member VMs.

Multicast transport between tenant system and NVE will now be described according to another aspect of the invention. The tenant system's switching network in a data center may run PIM-SM or PIM-SSM routing protocols to build the multicast distribution trees. However the L2-MC-CUG or L3-MC-CUG of tenant systems may span through virtual network overlay, to several interconnected data centers. Thus instead of building a single end-to-end multicast distribution tree over the virtual network overlay, which may consume significant bandwidth for the periodic control message transmission, over the slow WAN links, a segmented multicast distribution tree model would be more optimal w.r.t. resource usage and convergence speed. Thus the multicast distribution tree within the tenant system's L2-MC-CUG or L3-MC-CUG can be sub-divided into the following three types:—

Sender-Tenant-MCDT The multicast distribution tree segment that would exist between the sender Tenant system and the local data center's attached NVE(s). The tenants in this tree would originate the multicast traffic and will send towards the local attached NVEs.

Forwarder-NVE-MCDT The multicast distribution tree segment that would exist among the NVE(s) in the virtual network overlay in the context of Tennant's system virtual network. The NVE(s) in this tree would replicate the received traffic towards the leaf NVE nodes.

Receiver-Tenant-MCDT The multicast distribution tree segment that would exist between the remote data center's NVE(s) and the attached remote Tenant systems. The NVE(s) in this tree would replicate the received traffic towards the local attached Tenants.

Thus to enable end-to-end distribution of tenant systems' multicast traffic, these three types of trees need to be stitched at the data plane of NVE nodes, though at the control plane these trees function as independent trees in their individual segments. In other words, the Leaf node functionalities of Sender-Tenant-MCDT' need to be mapped/translated to the Root node functionalities of 'Forwarder-NVE-MCDT' at the upstream NVE nodes. Similarly the Leaf node functionalities of 'Forwarder-NVE-MCDT' need to be mapped/translated to the Root node functionalities of 'Receiver-NVE-MCDT' at the downstream NVE nodes.

When the Tenant system needs to send multicast traffic in the L2-MC-CUG, an optimal distribution tree can be computed using PCE engine, if the Tenant's switching network is using PBB MAC-in-MAC based tunnel encapsulation.

The IEEE-802.1aq and IEEE-802.1Qbg based SPB control plane which uses Layer-2 IS-IS can be tuned to advertise traffic engineering parameters via ISIS-TE extensions. The PCE servers would build traffic engineering resource mapping databases by listening to the ISIS-TE advertisements.

An optimal P2MP tree can be computed for the PBB-TE MAC-in-MAC P2MP Tunnel or P2MP Trill Tunnel, for the multicast distribution segment from the sender Tennant up-to the attached NVEs of local data center. Similarly optimal P2MP tree can be computed for the PBB-TE MAC-in-MAC P2MP Tunnel or P2MP TRILL Tunnel, for the multicast distribution segments from the remote NVEs to the attached receiver tenants of the remote data centers.

When the Tenant's switching network is capable of supporting MPLS-TP Tunnels and PWE3 Pseudo-wires using OSPF-TE, GMPLS-OSPF-TE or ISIS-TE, GMPLS-ISIS-TE routing control planes, Tunnels and Pseudo-wires can be dynamically provisioned along the optimal P2MP paths computed via PCE servers. For protection and restoration purposes, the P2MP MPLS-TP Tunnels can be setup in primary and backup redundancy pairs. Similarly for resiliency purposes the P2MP Pseudo-wires need to be setup in NVE dual homing scenarios. Since MPLS-TP Tunnel based transport system can function with or without requiring any IP address configurations, the P2MP MPLS-TP Tunnels can be setup in the Tenant system's switching network for both L2-CUG and L3-CUG communication domain.

Multicast transport between NVEs across NVO will now be described according to another aspect of the invention. Since the NVO overlay network topology is not visible to the underlying IP/MPLS WAN backbone network, the multicast distribution tree within the overlay network, should be built independently in the context of tenant system's virtual network.

When the Tenant system needs to send multicast traffic to several multicast groups which are located at the same set of destinations, a single shared distribution tree can be used inside overlay network, to optimize the consumption of bandwidth and memory resources within the overlay network.

MP-BGP based automatic discovery procedure indicates what indicate to the PE routers, i.e., NVE nodes, as to what kind of P2MP or MP2MP Tunnel needs to be setup for the multicast traffic distribution. When RSVP-TE based P2MP Tunnel signaling setup is available on the NVE nodes of overlay network, optimized P2MP MPLS-TP Tunnels can be setup for the multicast traffic transport.

These P2MP Tunnels of the overlay network may be further encapsulated in outer P2MP Tunnels of the IP/MPLS WAN backbone underlay network, depending the resource scaling, performance and optimization needs or policy requirements of underlay network operators. In either case one or more clusters of PCE servers can be used for the computation of optimal P2MP Tunnel path(s), based on one or more traffic engineering parameters, e.g. cost metric, bandwidth, path latency, packet loss rate, congestion status, DC resource utilization efficiency, protection/restoration capabilities etc. Similarly to carry tenant system's L2 or L3 multicast traffic over the virtual network overlay, P2MP Pseudo-wires need to be established. Several P2MP pseudo-wires can be transported over a single P2MP traffic engineered Tunnel.

For protection and restoration purposes, the P2MP MPLS-TP Tunnels can be setup in primary and backup redundancy pairs. Similarly for resiliency purposes the P2MP Pseudo-wires need to be setup in dual homing scenarios.

Since MPLS-TP Tunnel based transport system can function with or without requiring any IP address configurations, the P2MP MPLS-TP Tunnels can be setup in the NVO overlay for both L2-CUG virtual network or L3-CUG virtual network.

Multicast transport in inter-DC underlay across WAN will now be described according to another aspect of the invention. Since the underlay network among the interconnected data centers are not aware of the virtual network overlay transport, the multicast traffic of NVO will not be directly seen by the IP/MPLS WAN routers/switches of the underlay. The multicast traffic of the VDC's tenant systems which is carried by the P2MP Tunnels in the overlay network, may be further transported via underlay network's core MPLS-TE or MPLS-TP Tunnels in a hierarchical manner, for performance or resource optimization purposes. The underlay network's core MPLS-TE or MPLS-TP outer Tunnels transparently carry the overlay network's tunneled traffic either between the NVE nodes or between interior nodes (P-routers) of the underlay network.

Multicast transport of tenant system's control protocols will now be described according to another aspect of the invention. In a virtualized data center tenant system may run one more L2 or L3 control protocols that generate multicast traffic. As an example in a L2 bridged domain, tenant system may run bridging spanning tree (STP) protocols, including MSTP or RSTP etc. The BPDUs of STP protocol are flooded in the L2 CUG domain, which may be extended to remote data centers over the virtual network overlay. Similarly when OSPF routing is run in tenant system network, the routing protocol packets are flooded in the domain as IP multicast packets. In addition there might be traffic that are destined to unknown uni-cast, unknown multicast or broadcast destination addresses, and are flooded in the entire virtual network domain, both in local data center and the interconnected remote data centers.

In order to control the flooded traffic overhead which usually consumes a significant bandwidth of the physical network and also the processing power and memory of the tenant system end hosts (VM), rate limiting access control lists can be used in the forwarding plane. However rate limiting mat adversely impact the routing/signaling protocols, viz, OSPF, IS-IS, RSVP-TE, LDP, when the discarded packets may cause routing/signaling adjacencies being lost.

Also in a data center certain VM users may be running IP multicast applications, whose multicast traffic need to be delivered to other VMs in the local CUG domain and also to the VMs in remote data centers which are part of the same multicast group and same virtual network. In order to avoid unnecessary flooding of multicast traffic to either in the local VDC or remote VDCs, the NVE(s) which function as PE nodes in the NVO overlay, should maintain multicast group membership information.

The IGMP snooping and PIM snooping are mechanisms that can be enabled on the NVEs, so that IGMP or PIM Join/Prune messages can be snooped. When snooping is enabled, the NVEs build multicast distribution list for the VMs in the local VDC and multicast distribution list for the remote NVEs for each multicast group address, i.e. <S, G> or <*, G>. With IGMP or PIM snooping enabled at NVEs, multicast traffic distribution can be optimized Thus when a multicast packet is received at a NVE from a local VDC's Tennant system, the local NVE will send a copy of the frame to each of the multicast group member VMs in the local VDC and also to the remote NVEs which had indicated earlier to have attached VMs in the same multicast group. This procedure avoids sending multicast frames to tenant systems or VMs which are not members of the destination multicast group.

NVO using VPLS control plane (NVO-VPLS-CP) will now be described according to another aspect of the invention. Since VPLS enables LAN emulation over IP/MPLS backbone, the L2 domain of CUG communications, can be easily extended using VPLS services in the NVO. The NVEs of data centers will function as PE routers of VPLS domain. The tenant system network, which connects to the NVE will represent the attachment circuit to the VPLS PE and tenant systems themselves will represent the CE devices. When the NVE, is present in the virtual switch (vSwitch) of Hypervisor in a server blade, the VPLS PE router functionally need to be supported in the vSwitch. However legacy vSwitch may not be capable of supporting VPLS PE router functions. In such scenarios the ToR switch in data center should be used to implement NVE, i.e. VPLS PE router functions.

VLAN space or VM service instance limitation will now be described according to another aspect of the invention. When the tenant systems, i.e. VMs are communicating in a L2-CUG domain, the VLAN-ID is to used to distinguish per tenant virtual network. The VLAN-ID of the L2-CUG domain can be used as the service delimiter VLAN-ID when the per-tenant system isolated traffic is transported over the VPLS service instance. The VPLS service provides virtualized transport of tenant system traffic across a L2-CUG domain that may be spread to multiple VDCs over IP/MPLS WAN shared backbone. However VLAN-ID limit is only 4096, and so tenant system's L2-CUG services can scale only up to 4096 services.

The PBB, i.e. MAC-in-MAC encapsulation mechanism as specified in IEEE 802.1ah was designed to improve VLAN bases L2 domain service scaling limit by introducing a 24-bit I-SID value, in the Ethernet encapsulation header, which would represent the service instance in the backbone VLAN (B-VLAN) domain. Thus in a single B-VLAN domain 224=16 Million service instances are possible. Thus when the vSwitches in the Hypervisor are capable of supporting PBB Backbone-Edge Bridge (PBB-BEB) functionalities, the tenant system (VM) Ethernet frames can be directly encapsulated in PBB MAC-in-MAC header with an I-SID, before transmitting towards the NVE switches, i.e. VPLS-PE node.

Similarly when the local NVE (VPLS-PE) node receives Ethernet frame from remote NVE via the NVO overlay, after the NVO specific virtualization encapsulation (MPLS-TP Tunnel and VPLS Pseudo-wire headers) is removed, the frame will be sent towards to local tenant system's vSwitch as PBB MAC-in-MAC encapsulated frame. Since the PBB-BEB bridging module in this case is locally resident on the vSwitch, the C-VLAN ID or S-VLAN ID of the individual tenant system (VM) does not need to be sent the PBB MAC-in-MAC header, though it is present in the original MAC-in-MAC encapsulation definition. When the vSwitch of the Hypervisor is not capable of supporting PBB-BEB functionalities, the PBB MAC-in-MAC encapsulation should be done at the ToR switch (NVE) of the data center.

In a VPLS network the default MAC learning is based on the source MAC address of the traffic received at PE routers. This MAC learning happens at the data plane, and thus during initial traffic flow setup or during topology change, a significant load of MAC learning or MAC flushing causes a severe performance bottleneck and network convergence delay. Similarly when the VMs are involved in L3 forwarding across multiple L2-CUG(s), the MAC frames will carry IPv4 or IPv4 packets in the payload and ARP resolution will be required for these IP destinations. With several millions of VMs hosted by several thousand of virtualized servers in a interconnected data centers, ARP traffic explosion would cause a significant impact on the performance and robustness of VPLS PE routers.

A control plane based MAC learning can be used in addition to the data plane based learning to reduce the load on VPLS-PE routers, during virtual network topology change or VM user addition, deletion in the L2-CUG. A VPLS can support a MP-BGP based Auto-Discovery protocol run by the VPLS-PE routers, to discover the VPN membership information. This Auto-discovery protocol can be extended by adding optional TLVs to advertise the data plane learned MAC addresses from a local PE node to remote PE nodes in the same VPLS instance. This optional TLV will be advertised via MP-BGP as reachable NLRI or unreachable NLRI depending on if the MAC address is being advertised for learning or withdraw.

In the case of dynamic targeted LDP signaled VPLS services, the Pseudo-wire management already supports MAC flushing via LDP signaling status-TLV and MAC Withdraw extensions. When these features are enabled on the VPLS PE routers, the MAC aging and flushing overhead can also be offloaded from data plane to control plane. Similar or control plane based MAC address management, the ARP cache resolution, i.e. IP to MAC address mapping information learning or withdraw can also be advertised via new optional TLV, as an extension to the existing MP-BGP based Auto-Discovery protocol used by the VPLS-PE routers.

When the Tenant systems in the data center are part of a L2-CUG, the L2 uni-cast traffic will be flooded over the VLAN representing the L2-CUG, until the MAC address is learned in the data plane FDB. Similarly tenant system's L2 traffic for unknown uni-cast, multicast and broadcast destinations, will be flooded over the VLAN. When a VDC is required to support millions of VMs the VPLS-PE router will be overloaded with VLAN flooded traffic.

The SPB based control plane uses Layer-2 IS-IS routing protocol that can run in L2-CUG by default, without having to provision any configuration parameters. Alternately, a PBB MAC-in-MAC tunnel mechanism can be used in the VDC to connect the Tenant system to NVE switches. Thus when the L2-CUG is built using PBB MAC-in-MAC, the SPB based control plane will run IS-IS, which has a faster convergence and better scaling capabilities than the MSTP or RSTP based control planes. When H-VPLS is used as NVO control plane, the VPLS-PE nodes can interoperate with the PBB MAC-in-MAC based L2-CUGs of Tenant systems in the VDCs. When the VPLS-PE nodes implement PBB-BEB bridging functionalities towards the VDC tenant network, the tenant traffic would be received as PBB B-Tagged traffic. Since a single B-VLAN can aggregate several tenant services identified by 24-bit I-SID values (up to 224=16 Million), multiple tenant services can be transported using B-VLAN as the service delimiter VLAN tag over the VPLS network. The MAC learning and flooding is limited to B-VLAN scope as opposed to the individual C-VLAN or S-VLAN of Tennant systems.

Further, the CoS mapping behavior for the CE VLAN may not be explicitly specified in the case of VX-LAN transport. In an embodiment, this invention also provides a method to inherit the COS or DSCP and TTL value from CE (actual packet which is getting encapsulated). In this case, the COS value which resides inside the CE VLAN is completely encapsulated and outer VLAN tag may be and may not available or may be given with the lower or upper COS value than inner COS. The same kind of encapsulation is also done layer for Layer 3 DSCP and TTL value. This will allow the user to set the COS and TTL policies for VX-LAN network and based on the configuration the COS and TTL values will be set to the outer header (encapsulation header) from the actual packet (CE packet). Further, if the user wants to assign the different COS and TTL values for outer header then those new values will be applied irrespective of the actual packet COS and TTL and if the user wants to inherit the inner COS and TTL values then during the encapsulation those values will be copied to outer header.

In further exemplary embodiments of the present invention, the invention also provides a PCE based resource optimized Virtual Transport System and PCE based resource optimized Virtual Machine Mobility. The invention provides a mechanism of monitoring resource utilization by various groups of VMs against the hosting servers/hypervisors inside a DC network. A PCE based path computation framework 'VDC-PCE' is introduced in the VDC architecture that will listen to the VM's resource utilization summary from Server/Hypervisor and maintain the up-to-date resource database.

A VM controller functionality may be introduced as an architectural element into the VDC architecture. The VM controller may then service the VM to create, delete and relocate service requests coming from the management system, by utilizing the algorithmic computation services of VDC-PCE, to find the optimal placement of a new VM or optimal re-routing of an existing VM. Also, the VDC-PCE may dynamically map the resource utilization status of various Servers present in the local DC network based on status received from VDC-Monitor.

The VDC-PCE may also run policy constraint combinatorial optimization algorithms to find a free VM slot on a server that will satisfy the policy constraints optimally.

For example, the PCE based path computation framework proposed in this invention can be used to compute an end-to-end optimal path based on policy constraints and other traffic engineering parameters, e.g. cost metric, bandwidth guarantee, path latency, packet loss rate, DC resource utilization efficiency, congestion status, path protection and restoration capabilities etc.

Figure 4D:
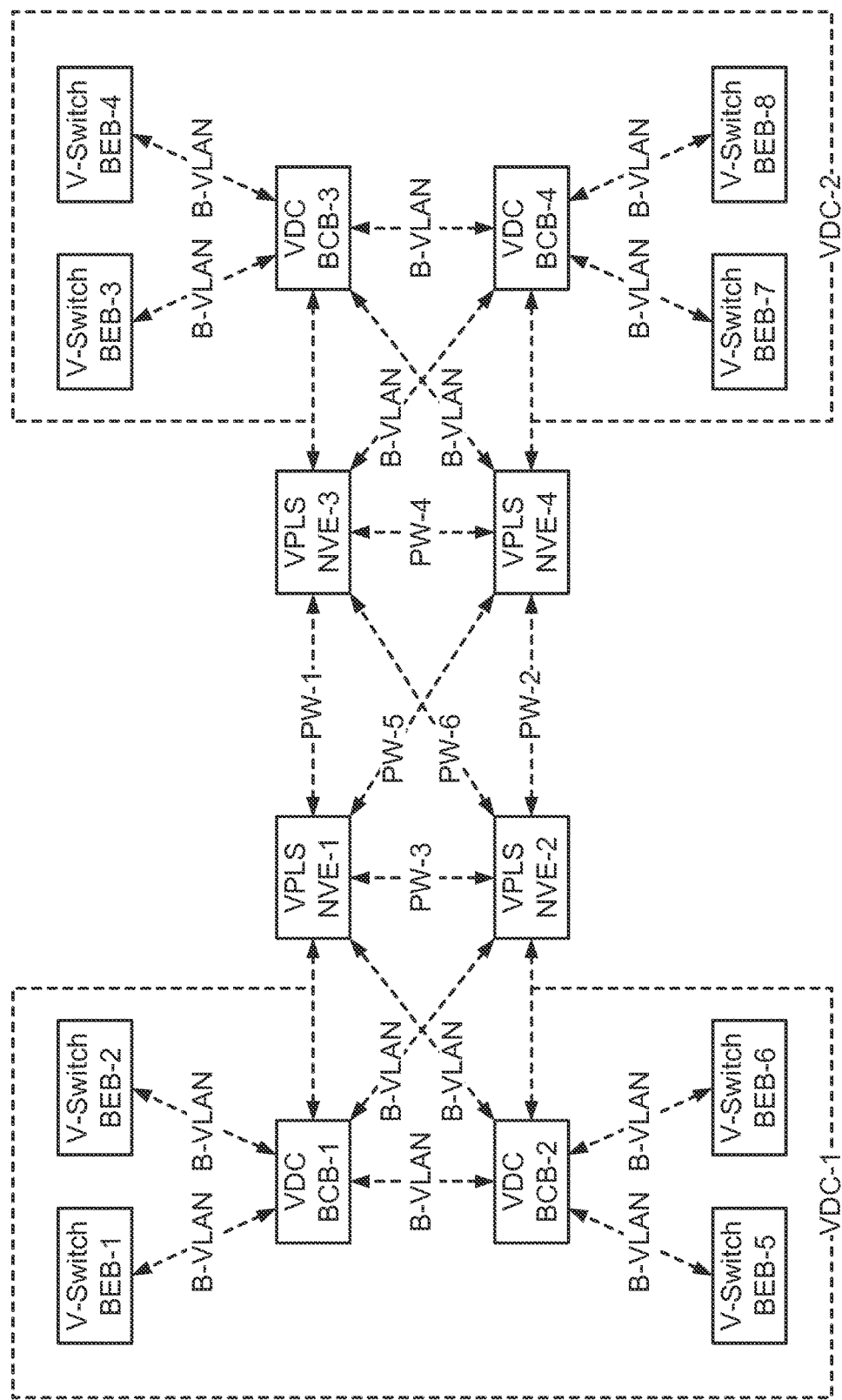
FIG. 4D illustrates H-VPLS NVE with PBB MAC-in-MAC transport in VDC, in accordance with various embodiments of the present invention.

Referring to FIG. 4D, when a VM communicates with peer VMs of L2-CUG or L3-CUG which might be located across multiple interconnected data centers, the traffic traverses three segments of an end-to-end virtual path (VP) viz., VP-Segment-1 4 Local-VM to Local-NVE
VP-Segment-2 4 Local-NVE to Remote-NVE
VP-Segment-3 4 Remote-NVE to Remote-VM.

When all the three virtual path segments belong to the same administrative domain, the PCEs in the traffic engineering domains of individual segments can collaborate with each other and an end-to-end optimal path can be algorithmically computed, from the traffic engineering resource mapping databases built inside the PCE servers.

But when the virtual path segments belong to different administrative domains, the PCEs in the individual domains, cannot disclose the domain topology internals outside their domains, due to service provider or operator's policy restrictions or for the reason topology database scalability issues. In such scenarios, the PCEs will compute optimal paths for their individual virtual path segments.

Though a global optima may yield much more optimal results, when joint optimization is performed for the end-to-end undivided path, the concatenated path segments obtained from local optima of individual per-domain virtual path segments will not be worse than dynamically explored paths via IGP or BGP or L2 control protocols (RSTP, MSTP).

When the L2 switching network between, Tenant system and NVE is built using PBB MAC-in-MAC tunneling or TRILL based tunneling and IEEE-802.1ah, IEEE-802.1Qbg based SPB with Multi-Path is enabled, the PCE servers will learn traffic engineering capabilities of the data center switching network based on ISIS-TE advertisements. When the Tenant system's switching network in VDC is L3 based, the traffic engineering capabilities of the network will be learnt by the resident PCE servers, via OSPF-TE, GMPLS-OSPF-TE or ISIS-TE, GMPLS-ISIS-TE based advertisements.

In certain VDCs where BGP support is available in the Tenant system's switching network, the PCE servers will learn traffic engineering capabilities via MP-BGP based advertisements. It may be worthwhile to note that PCEs in the virtual data centers will be required to maintain traffic engineering resource mapping databases on a per-Virtual Network basis, and also compute paths for the virtual path segments, on a per-virtual network basis, so that tenant system's traffic across different virtual networks are separated.

However the PCEs that serve for the NVO domain among the NVEs will be required to maintain traffic engineering resource mapping databases separately for each virtual network overlay and also separately for the IP/MPLS WAN based underlying network. Since there may be several hundred thousand virtual networks going over the IP/MPLS wan based underlying network, the load on the PCE servers may be excessively high. To load balance the excessive overhead of processing traffic engineering resource mapping updates and also frequent optimal path computation requests due to VM mobility or VM migration, the PCE servers in this domain may be grouped into clusters, similar to BGP confederation architecture.

Certain PCE clusters may be dedicated for path computation of IP/MPLS WAN Tunnels used in the underlying backbone network infrastructure and some other PCE clusters may be assigned the task of path computations for overlay network Tunnels, i.e. MPLS-TP Tunnels used to transport the VPLS Pseudo-wires.

Also, when a VM migrates from one server in a VDC into another server in a remote VDC, the new VPLS PE router, i.e. the new NVE switch with which the VM will be attached again, will learn the MAC address of the VM at the new location. However other Peer VMs in the L2-CUG or L3-CUG, which were communicating with this VM at the old location will still have the old MAC FDB entry or old ARP cache entry which is no longer valid.

Both the old NVE and new NVE may send Gratuitous ARP/RARP packets to cause ARP cash flushing at the peer VM's or peer NVE switches. The peer VM's or peer NVEs will learn ARP cash entries again from the new location of the VM. If the VM was communicating with the peer VMs in L2-CUG only, then until MAC flush and MAC re-learning happens at the peer VMs, the old NVE may continue to receive traffic destined to the old VM for a short while, which may cause traffic black-hole. Thus the old NVE may setup a Tunnel with the NVE of new VM location to re-direct the received traffic to the new VM location via its' new NVE switch.

In order to avoid any traffic loss during VM migration, the old NVE needs to pre-establish this Tunnel with the new NVE location before the new data center's Server sends the 'Activate VM' instruction to its' attached new NVE. This duration could be a configurable timeout period, after which the old NVE will tear down the tunnel, with the assumption that peer VMs have already learned the migrated VM's MAC over the virtual transport tunnel path through the new NVE location.

Alternately the old NVE can send a MAC Withdraw signal through the LDP control plane of the VPLS Pseudo-wires that were connecting the VM's L2 services with the remote NVE(s) of peer VM's. The peer VMs and their attached NVE(s) will flush the existing MAC FDB entries corresponding to the old NVE location and re-learn moved VM's MAC address through new NVE location. If the local VM is receiving L2 traffic from a remote VM which is outside the L2-CUG of the local VM, then the inbound traffic should be directly routed via a router VM, which is connected to the same NVE as the local VM.

This will make sure that the routed path for the inbound L2 traffic across the L2-CUG is shortest, i.e. only a single hop long. When the local VM moves to a new Server location, the router VM for the inbound traffic at the new location should also be at a single hop routed distance.

Similarly if the local VM is sending L2 traffic to a remote VM, which is outside the L2-CUG of the local VM, then the outbound traffic should be directly routed via a router VM, which is connected to the same NVE as the local VM. This will make sure that the routed path for the outbound L2 traffic across the L2-CUG is shortest, i.e. only a single hop long. When the local VM moves to a new Server location, the router VM for the outbound traffic, at the new location should also be at a single hop routed distance.

Dual Homing and Redundancy Support in NVO Transport in accordance with another aspect of the invention will now be described. Network availability is of critical importance service providers in data center networks, as it has a direct bearing on the CAPEX and OPEX of the business operations. Certain tenant systems or VM users may be running mission critical applications, that need to meet guaranteed SLA. Thus network redundancy or failure protection and repair is essential end-to-end within the tenant system or VM CUG communication domain. This will require protection and repair support in all the segments of a virtual network overlay, including:
  The local VDC network between the local NVE(s) and the local tenant systems.
  The part of the NVO among the NVEs.
  The remote VDC network between the remote NVE(s) and the remote tenant systems.

Dual Homing and Redundancy between Tenant System and NVE in accordance with another aspect of the invention will now be described. When the tenant network is L2 domain based, i.e. the VMs are communicating via L2 CUG, the Hypervisors of the VMs may be connected to two or more NVE nodes that are designated by the data center operators to form a redundancy group. The redundancy group of NVEs will belong to the same administration. The NVEs in the redundancy group may offer multi-home connectivity to either individual tenants (VM) or to a tenant network. When the NVEs are inter-connected via L2-VPN service to form the virtual network overlay, the tenant system represent the CE for the attachment circuits that connect to the multi-homing PE nodes (NVEs).

For a Tennant System CE to choose the correct attachment circuits for communication with the NVE, the member NVEs in the redundancy group need to run a failure detection and switchover protocol between themselves. Form NVE towards Tenant system CE, IEEE 802.1AX Link Aggregation Group (LAG) and protocol can be run, for redundancy selection. However an NVE may be serving Tennant systems of several Virtual Networks, and so LAG or Multi-Chassis LAG (MC-LAG) should be run between NVE(s) and the Tenant systems using Virtual Network context, i.e. run over the virtualized transport mechanism, NVO-MPLS-TP-VXTS, so that switchover among the redundancy group members happens, within the virtual network context.

Dual Homing and Redundancy between L-NVE and R-NVE in VDC in accordance with another aspect of the invention will now be described. When the NVEs of the NVO, are in multi-homing redundancy group, an inter-chassis communication (ICCP) protocol can be run to select which L2-VPN Pseudo-wire should be active or standby in the pseudo-wire redundancy group. Similarly when a local NVE (L-NVE) is connected via dual-homing with 2 or more redundant remote NVEs (R-NVE), the R-NVE(s) also run ICCP protocol for status monitoring and active/standby pseudo-wire selection from L-NVE to R-NVE.

Figure 4E:
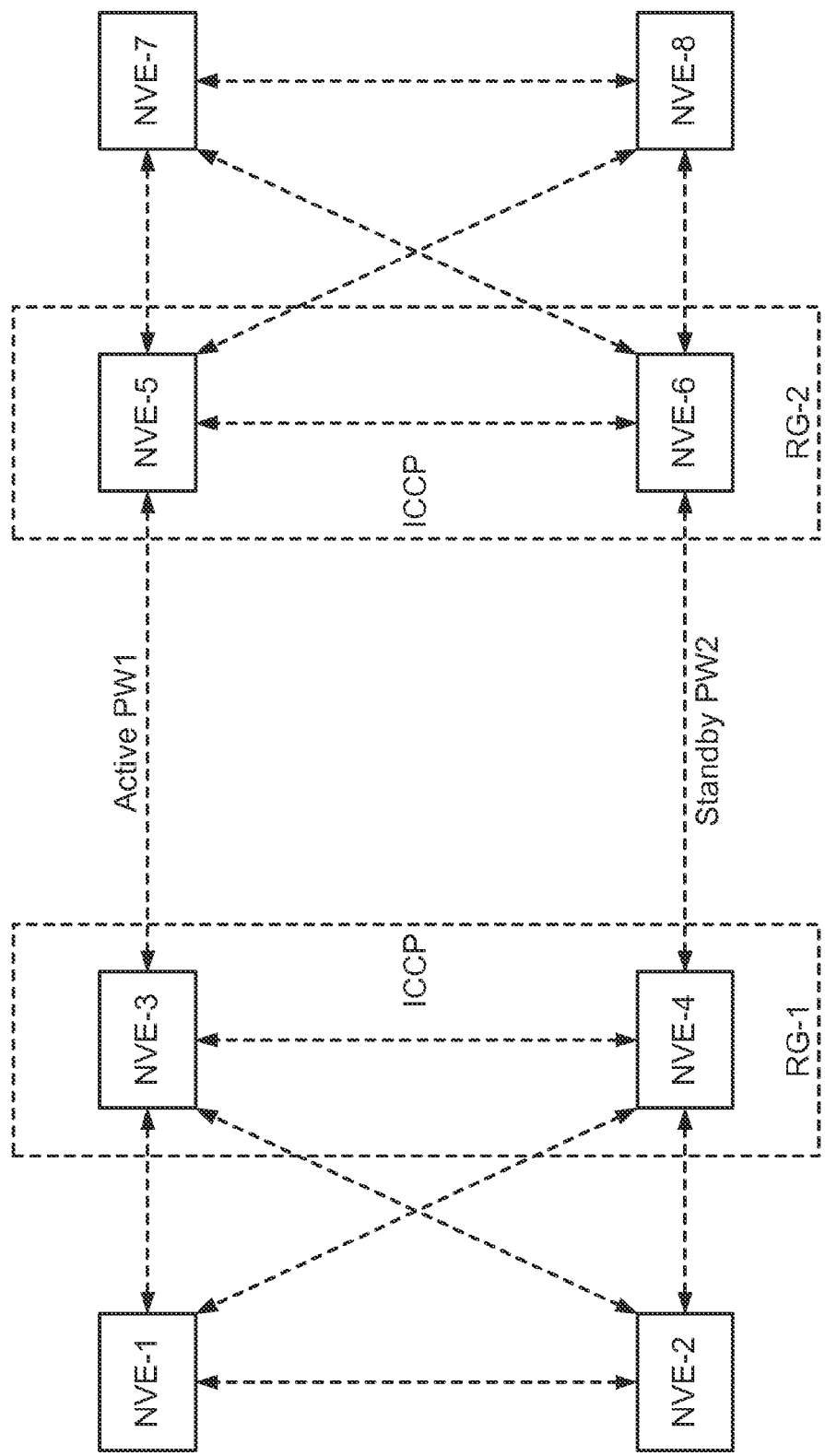
FIG. 4E is a single operator inter-DC NVE redundancy via ICCP using 2 pseudowires in accordance with various embodiments of the present invention.
Figure 4F:
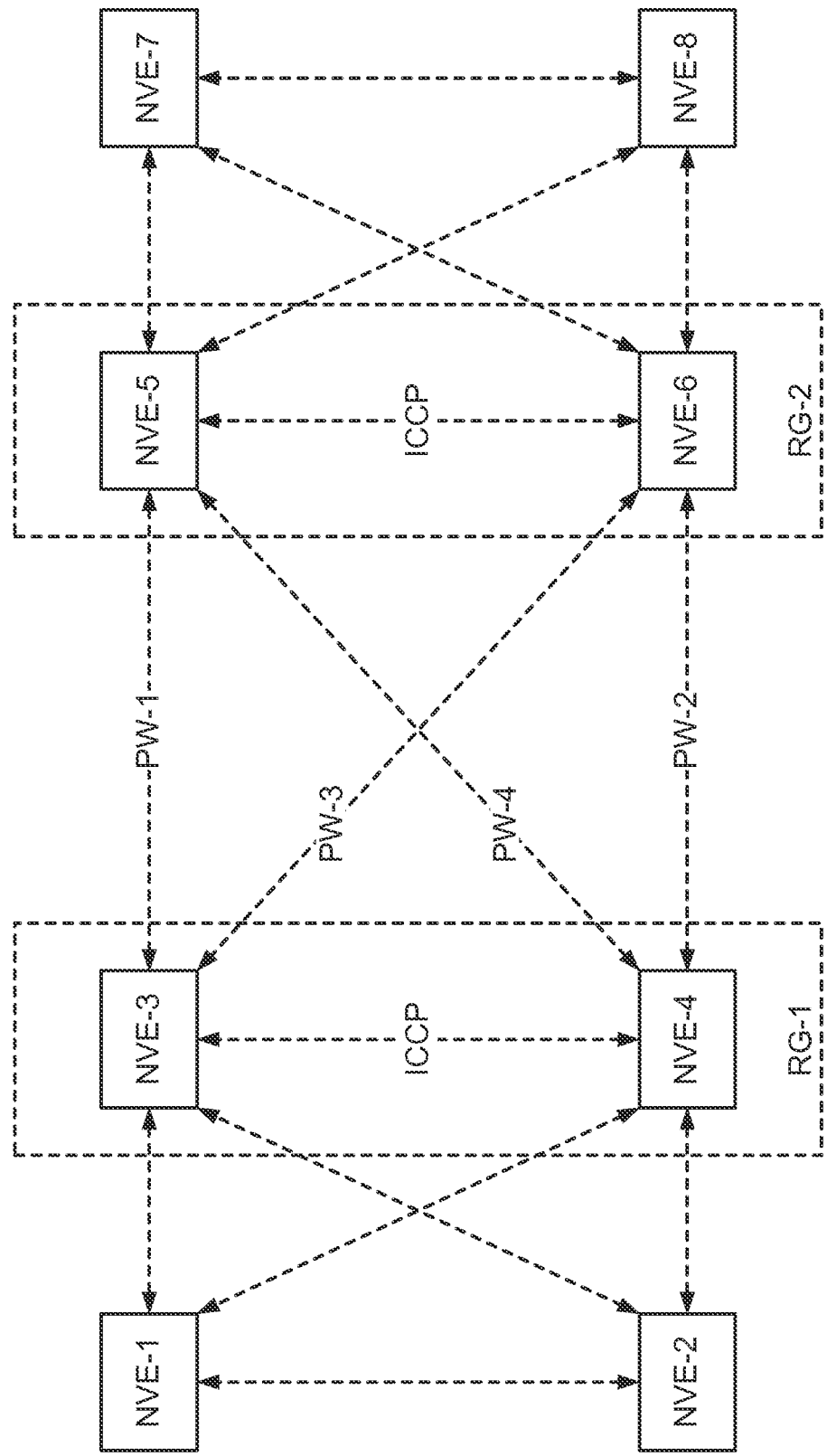
FIG. 4F is a dual operator inter-DC NVE redundancy via ICCP using 2 pseudowires in accordance with various embodiments of the present invention.

Single Operator Inter-DC Redundancy between L-NVE and R-NVE in accordance with another aspect of the invention will now be described with reference to FIG. 4E and Dual Operator Inter-DC Redundancy between L-NVE and R-NVE in accordance with another aspect of the invention will also be described with reference to FIG. 4F.

When MPLS-TP Bi-directional Tunnels are used to build the transport communication path among the NVE(s) in the virtual network overlay, redundancy and protection support can be provided by provisioning Bi-directional backup Tunnels. Either a 1:1 or 1:N Linear protection or ring based protection can be supported for the MPLS-TP Bi-directional Tunnels. When VPLS is used as a NVO Control Plane, the services of Tenant systems either in L2-CUG or L3-CUG are carried via PWE3 Pseudo-wires over the MPLS-TP Bi-directional Tunnels. Thus to enable end-to-end redundancy and protection for the Tenant system's services in L2-CUG or L3-CUG, a Tenant system should be connected to a redundant pair of NVEs in the local VDC.

When the L2-CUG or L3-CUG connection of a Tenant system with the active NVE fails, the equivalent connection of the tenant system with standby NVE will be activated. The tenant system's traffic will be forwarded over the connection with the now active, secondary NVE. If the virtual transport connection between the Tenant system and the NVE of the local data center is based on MPLS-TP Bi-directional Tunnel, and/or PWE3 Pseudo-wires, then IETF Standards based OAM protocols, i.e. LSP BFD and VCCV-BFD can be used for fast fault detection to trigger a protection switchover. If the connection is based on IEEE 802.1ah based PBB MAC-in-MAC Tunnel, then ITU-T Y.1731 based CFM protocol can be used for monitoring and fault detection. When data plane based OAM protocols are not available, the control plane based Tunnel reroute can be used, if the Tenant's switching network is using a fast converging control plane, viz. IEEE 802.1aq and IEEE 802.1Qbg based SPB or IETF defined TRILL protocol.

QoS Application In Virtualized Data Center Communication in accordance with another aspect of the invention will now be described. Since virtualized data centers run several different types of applications with, it is essential that end user's SLA guarantees are met end-to-end, so that SLA needs for mission critical applications can be supported. Also it is utmost important that end user's traffic is delivered with desired QoS or User's Quality of Experience (QoE) end-to-end without quality degradation.

QoS Application of Traffic between VM User and NVE in accordance with another aspect of the invention will now be described. When the VM user's traffic is sent over virtualized transport mechanisms of VX-LAN or NV-GRE, or NVO-MPLS-TP-VXTS, the tunnel is terminated and traffic is encapsulated at the ingress UNI of NVE. Similarly when the traffic from the egress UNI of a NVE is sent towards VM user, it is de-capsulated for VX-LAN or NV-GRE, or NVO-MPLS-TP-VXTS, and sent over the virtualized transport system. In either case, VM user's traffic may require SLA guarantees to be met at the UNI points of NVE across the interconnected virtualized data center environments. Since a data center's service may be used by millions of VM users, provisioning of SLA, i.e. QoS and B/W parameters at UNI points statically or via NMS/EMS would be an excessive burden for the for the DC network operators or DC service providers.

A dynamic signaling mechanism can be used to exchange the VM user's QoS and B/W related SLA parameters with the NVE(s). At present IETF has not standardized any such signaling protocol. However a 'VSI Discovery Protocol (VDP)' can be used by NVEs to discover the VM's configuration details, i.e. addition, deletion & modification from vServer (Hypervisors). An extension to this VDP protocol can be defined to exchange the QoS & B/W parameters of VM users with the NVE. When there is a IS-IS or LISP based control plane available, inside the NVO domain, these can be extended to carry VM user's QoS & B/W parameters to the connecting local NVE.

QoS Application of Virtualized Transport between L-NVE and R-NVE in accordance with another aspect of the invention will now be described. When the VM user's traffic is sent over virtualized transport mechanisms of VX-LAN or NV-GRE, the tunnel that carries the user's traffic through the NVO, is essentially an IP tunnel or GRE Tunnel Both the IP Tunnel or GRE Tunnel can make use of IP differentiated services (DiffServ) QoS so that different VM user's traffic flow(s) are classified at NVE(s) and appropriate DiffServ based QoS treatment is applied to each flow.

The NVEs need to be configured with IP DSCP to PHB mapping information details for effective traffic conditioning of VM user's virtual network separated traffic flows. Similarly when the traffic from the egress UNI of a NVE is sent towards VM user, it is encapsulated for VX-LAN or NV-GRE, or NVO-MPLS-TP-VXTS, and sent over the virtualized transport system.

QoS Application of NVO-MPLS-TP-TS based Transport in accordance with another aspect of the invention will now be described. When MPLS-TP Bi-directional Tunnels are used as virtualized transport to carry tenant system's traffic end-to-end in a L2-CUG or L3-CUG, the traffic engineering parameters as defined by MPLS Differentiated Services can be applied on these tunnels. Depending on the SLA requirements of the Tenant system's service profile, various Class-of-Service can be applied on these tunnels as EXP bits on the MPLS Tunnel header, and by setting up the EXP-to-PHB profiles on the LSR nodes, i.e. switching nodes in the Tenant's network.

OAM for the Virtualized Network Services (NVO-OAM) in accordance with another aspect of the invention will now be described. The OAM support is of primary importance in a virtualized network environment, where several millions of VM users services may be provisioned end-to-end through the network virtualization overlay. In a Virtualized data center, the VM users are not aware of the network virtualization underlay, i.e. the physical network infrastructure that transports the VM user's services, OAM service support is required in every segment of the virtualized network infrastructure. Since the end-to-end network virtualization overlay (NVO) across inter-connected data center has segmented architecture similar to L2/L3 VPN services, those OAM framework and protocols would be applicable in the case of NVO too. This aspect can allow end-to-end OAM services can be supported in the virtual network overlay, when the MPLS-TP based virtualized transport mechanism 'NVO-MPLS-TP-TS' is used in VDC. Additionally this aspect provides a mechanism for supporting 'Fault monitoring and 'Trace route' OAM services as extensions to the following two virtual transport systems. VX-LAN based Transport services in a VDC and NV-GRE based Transport services in a VDC.

OAM Services for NVO-VPLS-CP and NVO-MPLS-TP-TS in accordance with another aspect of the invention will now be described. Essentially there are three segments in the end-to-end transport path of tenant's network through the virtual network overlay.

Local-Tenant-Segment This is the local tenant's switched network segment up-to the NVE of the local VDC.

NVO-Segment This the virtual network overlay segment between the local-NVE and the remote-NVE.

Remote-Tenant-Segment This is the remote tenant's switched network segment up-to the NVE of the remote VDC.

When the Tennant system is communicating in L2-CUG only, the ITU-T Y.1731 standard based CFM monitoring service can be enabled in the Local-Tenant-Segment. Similarly CFM monitoring service can be enabled on the Remote-Tenant-Segment. The NVO-Segment which uses the VPLS control plane, with MPLS-TP based transport mechanism can run fault monitoring services on both transport layer and services layer. The MPLS-TP based Bi-Directional Associated or Bi-Directional Co-Routed Transport Tunnels can be configured to run LSP-BFD based Fault monitoring services.

When the LSP-BFD monitoring system reports a fault, MPLS-TP Tunnel protection switchover can be triggered to repair the faulted Tunnel. Similarly VCCV-BFD can be configured to run over the VPLS Pseudo-wires between the local-NVE and remote-NVE pairs.

When the VCCV-BFD monitoring system reports a fault, if there is a redundant group of Pseudo-wire(s) configured for the Dual-Homing support, then Pseudo-wire protection switchover can be triggered. This will cause a failover of the virtually transported service of the Tenant system from the local-NVE to standby remote-NVE to continue to transport tenant system's traffic to remote peers.

Virtualized Data Center Management Control Plane in accordance with another aspect of the invention will now be described. Since in a virtualized data center (VDC), the Tenant systems will communicate in L2-CUG or L3-CUG which may span across the data centers, there will be two types of interactions. The interaction between the Tenant system and the NVE in the local data center. The interaction between a local NVE and a group of remote NVEs. Thus to enable communication among the members of a L2-CUG or L3-CUG there will be a need for two different control planes.

A control plane for interaction between a Tenant system and the NVE (CP-TES-NVE), which is primarily responsible for managing the VM attachment and detachments from Server to the NVE. A control plane for interaction among the NVEs through NVA (CP-NVE-NVA), which is primarily responsible for tenant system address mapping to virtual networks and dissemination of the mapping information.

Tenant System Networking Architecture in accordance with another aspect of the invention will now be described. There are four components involved in tenant communication that constitute the networking architecture, viz. tenant system, local & remote NVE and the Network Virtualization Authority (NVA). A VDC may contain one or more virtualized servers, with each server hosting thru hypervisor one or more VMs. A tenant system in a VDC may consist of one more VMs. VMs have attached vNICs, using which they communicate with NVE or other VMs. The vNIC of a VM has a assigned MAC address, which is used for ethernet frame exchange with NVE or other VMs. Corresponding to a MAC address a VM may be assigned multiple IP addresses. When a VM has multiple IP addresses assigned for a MAC address, each combination of <MAC-Address, IP-Address> is used to communicate in a different virtual network (VN).

A single VM or a Tenant system may connect to multiple NVE(s) in the same virtual network, for multi-homing scenarios. A single NVE may be required to provide NVO transport service for multiple tenant or VMs in the same VDC. Also a single NVE may serve for multiple different tenant systems (VMs), with each tenant system belonging to a different virtual network (VN).

When a Tenant system or VM is a member of multiple L2/L3-CUGs, it will belong to multiple virtual networks (VN). Each VN, which a Tenant system belongs to may be served by a different NVE at a VDC. Normally a tenant system will communicate other tenant system through the locally attached NVE, which belong to the same VN. But when a Tennant system in one VN (VN-1) wants to communicate with another Tenant system in a different VN, (VN-2), the network virtualization controller (NVA) will facilitate communication by establishing a Tunnel between the local NVE and the remote NV, with which the tenant systems are associated.

Figure 4G:
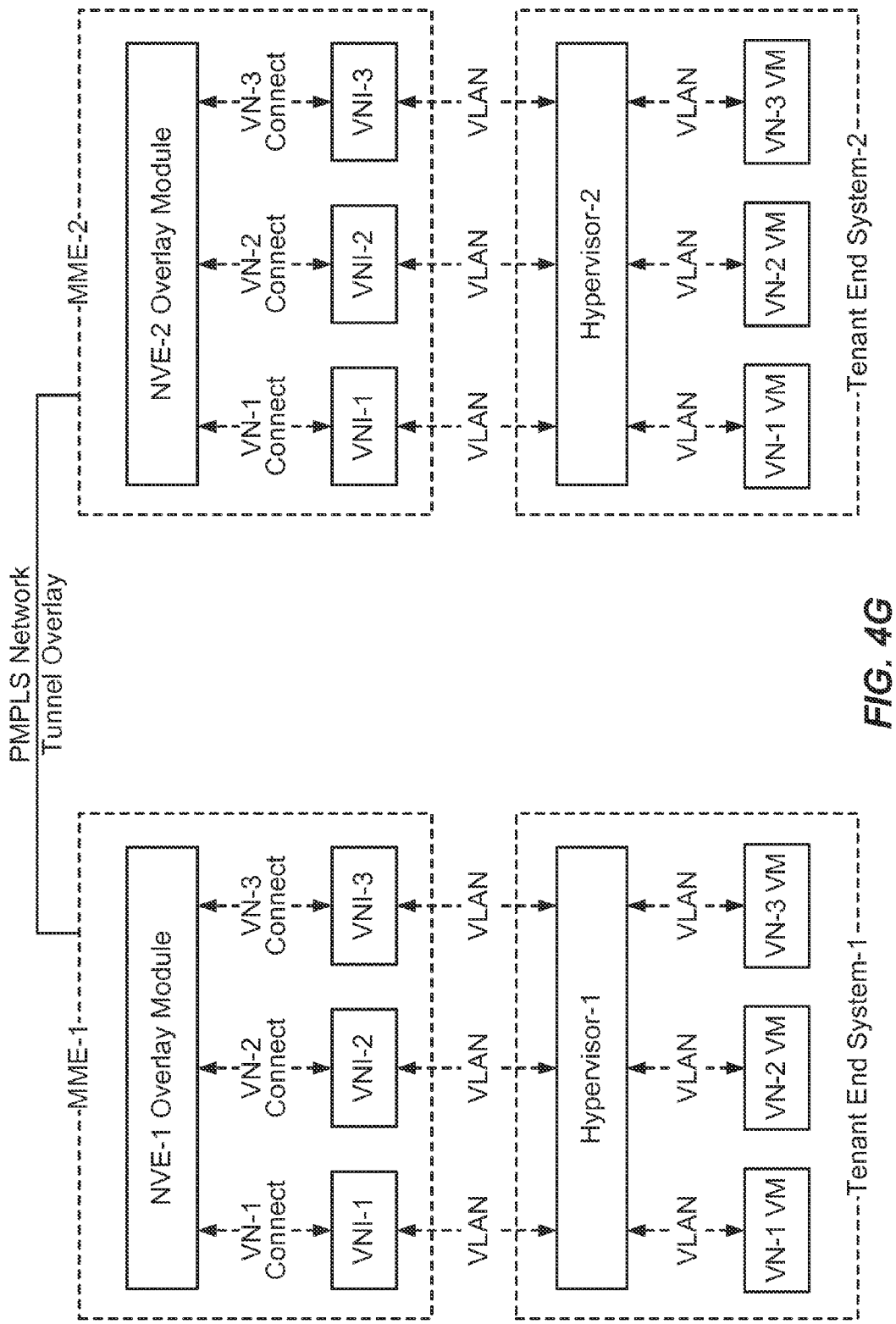
FIG. 4G is a Tenant system to NVE networking diagram, in accordance with various embodiments of the present invention.

NVO Service by NVE in accordance with another aspect of the invention will now be described with reference to FIG. 4G. When the tenant systems are communicating in L2-CUG domain, the NVEs require the knowledge of Tenant systems' MAC addresses only to facilitate virtualized transport of L2 traffic, i.e. outgoing L2 frames are encapsulated using virtual transport header before sending towards the remote NVE. Similarly the L2 frames received from remote NVEs are stripped off the virtual transport header before forwarding to the tenant systems based on the MAC address.

Though the NVE forwards tenant system's L2 traffic based on the MAC address only, the payload area may carry IPv4 or IPv6 traffic inside. In such scenarios, the VM may be acting as a IPv4 or IPv6 router in the context of the virtual network. Similarly a VM may be functioning as a bridge between two virtual networks (VN), that it is a member of in a VDC. In such cases VM is member of multiple virtual networks and attaches to the NVE using different vMAC addresses for each VN.

When the tenant systems are communicating in L3-CUG in a virtual network, the NVE needs to know the all the IP addresses of the tenant system, in order to correctly route the L3 traffic received from the remote NVEs towards the locally attached tenants. The tenant system will only accept the IPv4 or IPv6 packets if the destination MAC address of the frames match its' local V-MAC address.

TES to NVE Management Signaling Control Plane in accordance with another aspect of the invention will now be described. In a virtualized data center (VDC), the Tenant system will interact with the NVE, whenever there is a VM management action or for service provisioning and de-provisioning requests. The VM management actions are initiated on user's request, from the VM/Cloud Manager or from NMS system, to the Hypervisor which manages the VMs on a server. However NVEs may not always be available, or sometimes may be rebooting or undergoing S/W upgrade or maintenance operations. Besides more importantly the VMs can move frequently across data center servers, because of load balancing purposes or VN specific policy reasons. Thus instead of Cloud Management system directly sending VM provisioning/de-provisioning requests to NVEs, the VM configuration parameters and applicable policy parameters can be sent to the Server hosting the VM services a data center.

The Servers can save the VM's configuration and policy parameters in the disk and restart VM provisioning in the NVO, when the NVE is available for network virtualization service again. Thus a signaling protocol is necessary to send the VM's configuration parameters and status updates and migration requests from the Server hosting the VM to the local NVE switch. The signaling protocol should also have a periodic Health status checking scheme to verify the availability of the NVE switch.

In a virtualized data center (VDC), the typical VM management actions can be categorized as follows.

VM Creation—Creation of a VM on a specific Server in a DC.

VM Pre-Association with NVE—Pre-Association of a VM with a NVE at VDC.

VM Association with NVE—Association of a VM with a NVE at VDC.

VM Suspension—Suspending or Stop execution of a VM.

VM Resume—Resuming the execution of suspended VM.

VM Relocation—Relocation or migration of a VM from one server to another in the same or different DC.

VM Termination—Termination or shutdown of a VM.

VM Creation: In order to create a VM on a DC server platform, the Cloud services NMS or OSS/BSS application sends a Create request Transaction, specifying certain SLA parameters. These SLA parameters may include, but not limited to CPU, Memory, Storage and network communication requirements. The VM manager for the server instructs the hypervisor to reserve the parameters as requested by the end user's SLA. After the VM is created, it has the allocated resources and ready to run. But at this time, the VM is not yet associated with any NVE and so cannot communicate with peer VMs of the L2-CUG or L3-CUG, it's configured for.

VM Pre-Association: After the VM is created, the network domain configuration parameters, i.e. MAC address, IP address if any, ACL policies, QoS parameters etc. need to be sent to the NVE node which is attached with the hypervisor hosting the VM. The NVE needs these parameters to facilitate forwarding or filtering of traffic received from remote data centers to this VM. The NVE switch configures itself with these parameters for the virtual network, that the VM is part of This stage of configuration is considered pre-association, since the NVE node does not actually start applying those parameters, unless it subsequently receives an activation request from the VM.

VM Association: After the pre-Association phase is completed, the VM is activated at NVE, by sending a Association request. In the Pre-Association phase, NVE configures and installs the VM's parameters in the context of the virtual network, but does not actually activate those in the forwarding path. When the Association request is received for this VM, the network parameters are enabled on the switching infrastructure.

VM Suspension: In data center applications, sometimes it may be necessary to suspend the execution of a VM, for temporary period of time. When the VM is suspended it's the execution states and resource holdings of all the applications running on it are saved. Before the suspension, the NVE switch needs to be informed, so that network configuration parameters, i.e. ACL, QoS, B/W and MAC address mapping etc. are deactivated in the local switch's data path. This will make sure, that remote peer VM's traffic within the same virtual network are not unnecessarily forwarded to the VM, when it's in the suspended state.

VM Resume: When a suspended VM is required to continue executing again, it needs to be activated. When the VM resumes execution, a request is sent to NVE to re-active the network configuration parameters for the VM, in the context of virtual network. After the resume, all the applications will continue their executions from the save states, i.e. from the point they had left at the time of suspension. After the resume, the NVE switch needs to be informed, so that network configuration parameters, i.e. ACL, QoS, B/W and MAC address mapping etc. are re-activated in the local switch's data path. This will make sure, that remote peer VM's traffic within the same virtual network will start getting forwarded to the VM again, when it's in the resume state.

VM Mobility/Relocation in VDC: In a Data Center Virtual Machines often require movement from one server in the data center to another server in the same or different data center. During movement or relocation of VM, the IP and MAC address should be retained, i.e. those should not change because of relocation. The VM movement may be triggered by one or more reasons related to VM operations in data center networks. Such as bandwidth of the communication links between VM's server and the NVE supporting that VM, computational power of the processors in the server, storage requirement on the Virtual Disk (VDS), and computational load on the processors of the servers hosting the VM(s).

When a VM communicate with other VMs in the same L2 physical domain, they are part of the same L2-CUG, which is identified by a VLAN-ID. But when the VMs belong to different L2-CUG, they have different VLAN-IDs. When the VM moves from one server to another in the same data center or in a different data center, the VM at the new location, should be able to communicate, i.e. exchange traffic with peer VMs, which may be in the same new data center location, or multiple different data centers. A VM may be moved from one server to another, while the VM is in suspended state or in running state. During VM relocation IP address must be preserved. Also the transport connections must be preserved when a VM is relocated in running state.

Let us assume that a VM-x is a part of a L2-CUG, say 'L2-CUG-x' which is in a L2 physical domain, say 'L2-PD-x' and moves from the current server to a new server which belongs to a new L2 physical domain 'L2-PD-y' in a different data center. Also assume that the VM-x's L2-CUG communication peers, VM-z1, VM-z2, VM-z3, . . . VM-zN, belong to different L2 physical domains, say L2-PD-z1, L2-PD-z2, L2-PD-z3, . . . L2-PD-zN respectively, which are located in different data centers.

The VM relocation does not change the L2-CUG membership of the VM-x, but in order for this VM at the new location, say VM-y to be able to communicate with the old peers, the new L2 physical domain 'L2-PD-y' must become interconnected with other L2 Physical domains, L2-PD-z1, L2-PD-z2, L2-PD-z3, . . . L2-PDzN respectively.

Also to allow seamless relocation of the VM-x, it's MAC address should be preserved, so that L2 ethernet header of the frames exchanged with the existing peer VMs, continue to use the same pair of source and destination MAC addresses.

Also after VM-x is relocated to L2-PD-y, if the old domain L2-PD-x does not contain any more VMs of the L2-CUG-x, then L2-PD-x no longer needs to remain interconnected with the other L2 physical domains, L2-PD-z1, L2-PD-z2, L2-PD-z3, . . . L2-PD-zN, that contain the rest of the VMs of L2-CUG-x.

Since the VMs physically belong to L2 physical domains, and every member of a L2-CUG belongs to a L2 physical domain, the L2-CUG-x can be expressed as a set theoretic intersection of the interconnected L2 physical domains, for this L2-CUG. In other words, L2-CUG-x=Π L2-PD-zj, $1 \leq j \leq N$. Thus due to dynamic relocation of VMs of a particular L2-CUG, the collection of interconnected L2 physical domains that contain the L2-CUG would also change dynamically.

VM non-Graceful Termination: When the Cloud services management NMS station or OSS/BSS system desires to delete the VM from the data center, a transaction is sent to the VM manager of the server, indicating termination request. The termination of a VM will cause all the resources on the server platform, include CPU, memory, I/O bandwidth reservation etc. that are currently held by the requested VM will be released. All the applications running on the VM will also be terminated. The Hypervisor will send a VM Termination request to the attached NVE, which will in turn de-provision VM's network parameters, i.e. QoS, B/W, ACL, MAC address mapping etc. from the switching data plane. The NVE node will also update the NVA's databases, and/or advertise MP-BGP route withdraw to indicate the remote NVEs about the VM's abrupt terminate. The remote NVEs will also de-provision VM MAC address mapping entries from their local switching data plane infrastructure. This method of VM termination is termed as non-Graceful termination, since the Hypervisor and the NVE nodes do not wait for the VM's applications or peer VMs to finish their ongoing conversation with the local VM in a graceful manner.

VM Graceful Termination (see FIG. 4H): In the case of graceful termination of a running VM, the hypervisors and NVE switches involved will not terminate or free the VM's resources on the server abruptly. The VM termination in this case goes through a sequence of collaborative tasks that need to be completed, before the VM can be completely terminated from the local server's platform. This procedure can be stated in a stepwise manner below. In the graceful shutdown scenario, the hypervisor hosting the VM in question, will propagate the VM Graceful Shutdown request to all the NVE nodes that his VM is currently attached with. The directly attached NVE nodes then update themselves to be in VM-Graceful-Shutdown pending state. The directly attached NVE nodes then propagate the Graceful Shutdown request to the remote NVEs that are part of the same virtual network. The remote NVEs will in turn update their local states to be VM-Graceful-Shutdown pending state and propagate VM Graceful-Shutdown request to the remote VMs in the local data center. The remote VMs will let their applications to gracefully finish or close any on-going L2-CUG or L3-CUG conversations, and send Graceful-Shutdown Complete indication to the remove NVEs. The remote NVEs will then de-provision the shutdown requested VM's resources and network parameters from their data-path and respond back to the local NVE for the VM, indicating Graceful shutdown completion. The local NVE will then de-provision the shutdown requested VM's resources and network parameters from it's data-path and respond back to the local Hypervisor for the VM, indicating Graceful shutdown completion. The local Hypervisor will now, wait for the local VM to gracefully terminate all the running applications. When the local VM terminates all the applications running on it, will notify the Hypervisor about Graceful Shutdown completion. The local Hypervisor will then release all resources on the server platform, including CPU, memory, I/O bandwidth reservation etc. that are currently held by the requested VM. The VM will now be deleted from this Server.

Figure 4H:
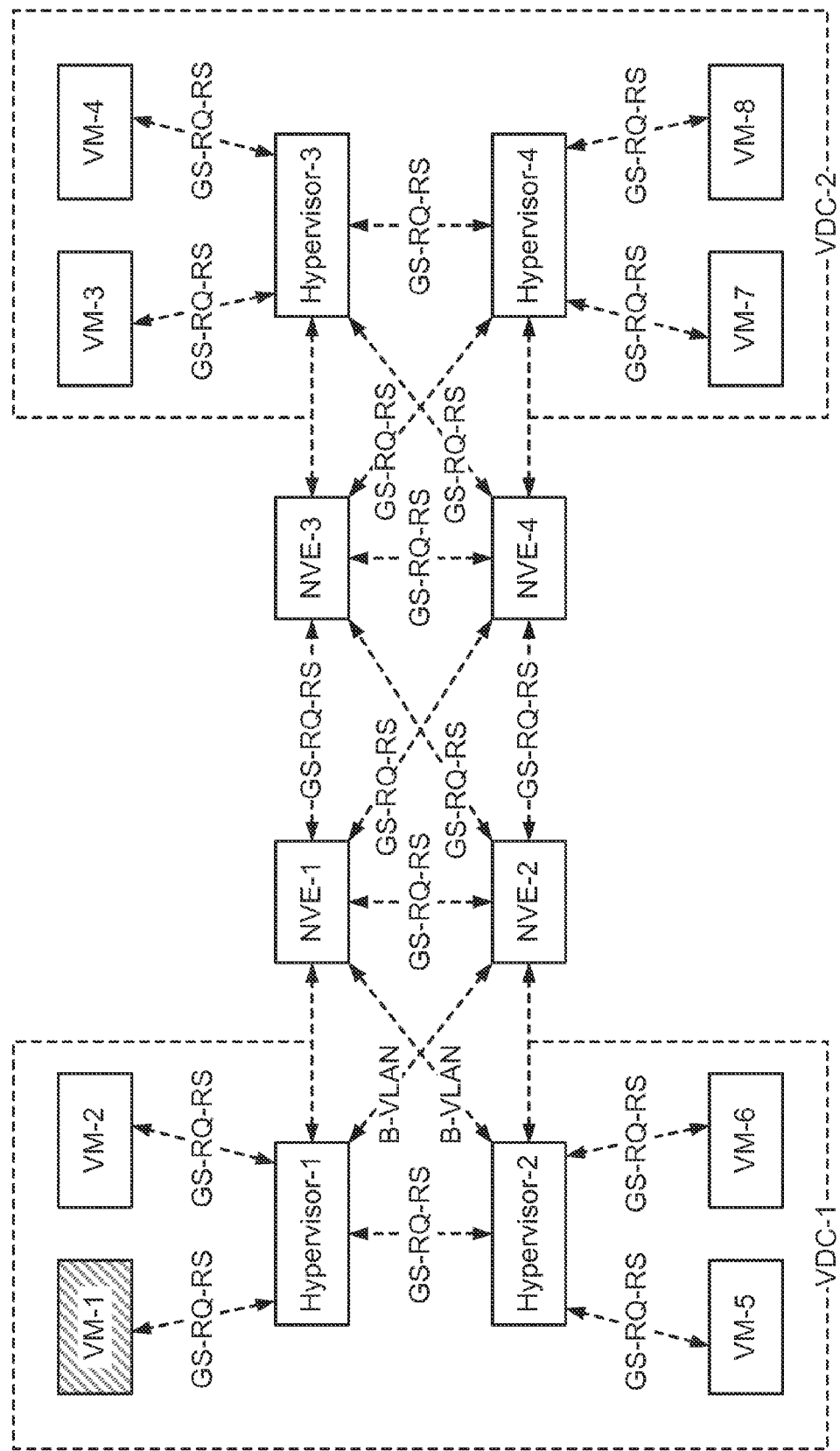
FIG. 4H is a VM graceful shutdown request/response flow in a VDC in accordance with various embodiments of the present invention.

In FIG. 4H:

VM-x, $1 \leq x \leq 8$: Virtual Machines.

Hypervisor-y, $1 \leq y \leq 4$: Data Center Hypervisors.

NVE-z, $1 \leq z \leq 4$: NVE switches in Data Centers.

GS_RQ_RS: VM Graceful Shutdown Request & Response messages.

VM-1: VM to be gracefully shutdown.

NVE to NVA Routing/Signaling Control Plane Functions in accordance with another aspect of the invention will now be described. In order for the NVEs to be capable of forwarding L2 or L3 traffic of tenant systems from one data center to peer tenant systems at remote data centers, the tenant system's address to VN mapping information should be known to all the NVEs in that VN. Such mapping information can be either dynamically distributed among the NVEs in the same VN, via a routing protocol, MP-BGP based extension or can be stored in a centralized server say LDAP. The centralized server, which is also known as 'Network Virtualization Authority (NVA)' cam distribute, the address mapping information to the NVEs either via push model or pull model. In the push model, the NVA itself distributes updates to all the NVEs that are in the same VN. Similarly in the pull model, the NVE is required to fetch the mapping information from the NVA, whenever such mapping information is necessary to forward a VM user's L2 or L3 traffic.

However when the data center grows to a large extent and low latency forwarding is required from the NVO forwarding service, the MP-BGP based dynamic update distribution of address mapping information would scale and perform better. Also to facilitate scaling of NVO overlay, either BGP route reflector can be used in the NVO or BGP confederation based distributed cluster architecture can be used.

Address mapping creation—When the tenant system signals a new MAC address or IP address assignment in a particular VN, to the NVE, the NVE creates a mapping of tenant system's virtual network L2 or L3 address with its local underlying network IP address. The NVE distributes this mapping information via MP-BGP route updates to the other NVEs in the overlay network.

Address mapping deletion—When the tenant system signals an existing MAC address or IP address detachment from a particular VN, to the NVE, the NVE deletes the mapping of tenant system's virtual network L2 or L3 address with its local underlying network IP address. The NVE also relays the deletion of this mapping information via MP-BGP route withdraw to the other NVEs in the overlay network.

Address mapping migration—When the VM of a tenant system migrates to another server in the same or a remote data center, the local NVE knows the new NVE location of the migrated VM. Thus the local NVE will not need the address map for this VM and can be deleted and also MP-BGP route withdraw can be propagated to other NVEs. The new NVE will receive the address mapping creation signal from the migrated VM and will distribute to the other NVEs in the overlay via MP-BGP route update operation.

VM shutdown—When a VM shutdown is explicitly signaled to the NVE or the NVE detects via missing Health Check polls, the NVE will delete all the address mapping information of that VM in the attached virtual networks, from its local database and will also propagate such deletions via MP-BGP based route withdraw to other NVEs of the overlay in the same set of virtual networks.

VM Optimal Placement and Relocation—(Optimal Placement of VM in Data Center) When a VM is initially provisioned in a data center, it is attached to a Hypervisor of a server and it's communication parameters, including V-NIC MAC address, IP subnet if any and the L2-CUG domain's VLAN-ID are configured via NMS or Cloud provisioning system. The selection of Server and the data center is decided by the NMS or Cloud provisioning system, either by the cloud service provider's policy.

According to another aspect of the invention, the NMS or Cloud provisioning system can be augmented to query an intelligent path computation server which can run a series a of optimization algorithms against a data center resource usage monitored data. The optimization algorithm would find a Data center and Server combination that which satisfies the SLA, i.e. resource requirement of the new VM, e.g. CPU processing power, I/O bandwidth, memory size requirement, virtual disk space limit, application performance requirements etc.

The PCE servers themselves listen to the IGP-TE network resource advertisements and build up traffic engineering databases internally, which is used for path computation. One aspect includes an extension to the distributed PCE framework, such that in a data center, a PCE server can be resident along with a new resource mapping server component, 'VDC-Resource-Mapper'. The new resource mapping server component would periodically collect the resource utilizations of various servers in the data center network via resource monitor of the Hypervisor. This resource usage data collection by the 'VDC-Resource-Mapper from Hypervisor' resource monitor may be triggered either in a pull model or push model.

The VDC-Resource-Mapper translates the collected resource usage data in the form of abstract resource mapping objects that can be represented as Higher dimensional path resource attributes, termed as VM x-CUG Path attributes (x=L2 or L3). When the interconnected data center networks are represented using a graph G=(V, E), 'V' being the Vertex set and 'E' being the edge set, the monitored and transformed resource attributes can be applied to the vertices and edges of the graph 'G'. The resource attributes application on graph 'G' would transform it into a Data center 'Resource Mapping Graph' (DC-RMG). This DC-RMG would be maintained inside the PCE server similar to traffic engineering databases. The VDC-Resource-Mapper would advertise the changes in path resource attributes based data center's update policies, using IGP-TE extensions, i.e. using custom extensions of OSPF-TE, GMPLS-OSPF-TE, or ISIS-TE and GMPLS-ISIS-TE respectively.

The PCE servers are equipped to listen traffic engineering advertisements from OSPF-TE, GMPLS-OSPF-TE, ISIS-TE, GMPLS-ISIS-TE, and they would be able to build a kind of modified traffic engineering databases that would represent the DC-RMG.

The actual optimization algorithms that PCE server can run is not part of IETF standardization and so a suite of multiple different optimization algorithms can be implemented inside a PCE server's Algorithm engine. The set of optimization algorithms that can typically be used, but not limited to the following list for computing optimal paths using the DC-RMG:

Convex Optimization Algorithms (Linear Programming, Mixed-Integer Programming)
  Meta-Heuristic Optimization Algorithms
  Ant Colony Optimization.
  Simulated Annealing.
  Neurological-Computing model based optimization.
  Artificial Neural Network (ANN) based optimization.
  Multi-Objective Optimization using Evolutionary Algorithms.
  Game Theoretic Optimization Algorithms
  Combinatorial Auction Algorithms
  2-Player rectangular Game or N-Player game, with Nash Equillibria.
  Differential Game Strategies.
  Stochastic Optimization and Dynamic Programming methods.
  Markov Chain based optimization.
  Quantum Mechanical Path Integral based optimizations (which is also used in Financial Portfolio Optimization).

Once the DC-RMG is formed, one or more of the above optimization algorithms can be used to find the optimal vertex in the graph, that satisfies the policy and resource constraints of the new VM. This optimal vertex would be the server in the Data Center, where the new VM should be placed. In other words, in order to optimally place a VM which needs to communicate with the members of a L2-CUG, the optimal path finding algorithm would choose a specific Server in a specific Data Center, where the new VM should be provisioned and associated with the Virtual Network context of the serving NVE.

Server's VM Resource Usage Monitoring in accordance with another aspect of the invention will now be described. Inside DC network, as the VMs perform computational jobs or run many other networking applications, e.g. security services gateway, scientific applications, or radio resource computation for a wireless base station etc. the data center server's load changes dynamically. The resource availabilities of servers hosting VMs, in terms of CPU utilization, I/O bandwidth, memory availabilities virtual server disk space utilizations etc. also changes dynamically.

The Hypervisor needs to know when performance of one or more VM(s) are crossing the lower thresholds of SLA compliance, so that those VMs can be relocated to some other servers in the same data center or another remote data center. The resource monitoring component in the server would send the server's resource utilization data to the 'VDC-Resource-Mapper' which would then process and transform the data into a set of abstract resource assignments for the DC-RMG and advertise to the PCE Servers via IGP-TE advertisement mechanism.

Server's VM Resource Usage Advertisement in accordance with another aspect of the invention will now be described. Inside DC network, as the VMs perform computational jobs or run many other networking applications, e.g. security services gateway, scientific applications, or radio resource computation for a wireless base station etc. the data center server's load changes dynamically.

Figure 4I:
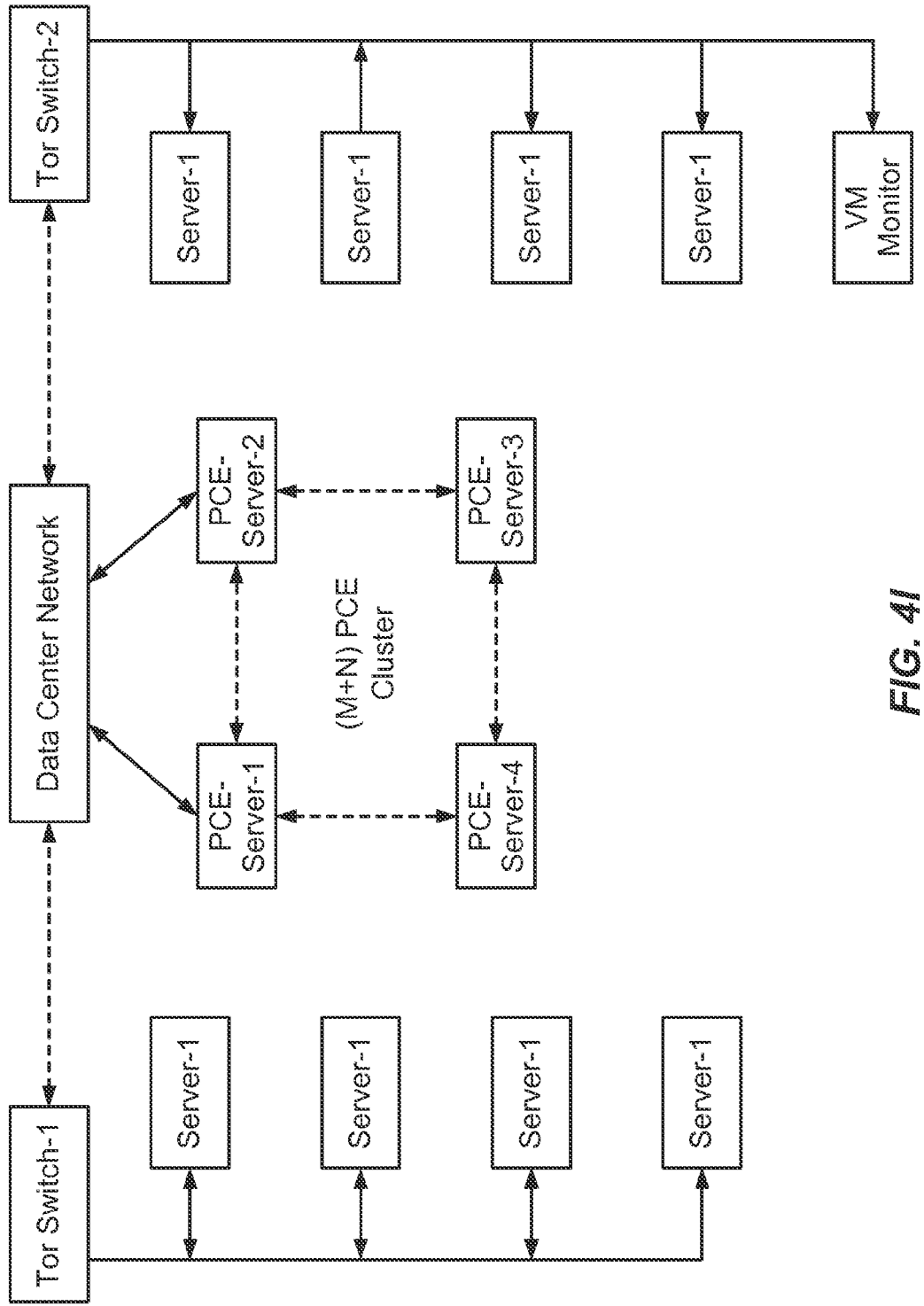
FIG. 4I is a data center network virtualization architecture with PCE cluster in accordance with various embodiments of the present invention.

FIG. 4I illustrates a VM Location Computation using PCE Service according to another aspect of the invention.

Data Center VM Resource Management Control Protocol in accordance with another aspect of the invention will now be described. In data center networks, it's often desirable to know if certain servers hosting VMs are capable of performing VM resource usage monitoring and resource usage information propagation.

This aspect provides protocol extensions of OSPF-TE and ISIS-TE to advertise such capabilities. The OSPF-TE and ISIS-TE speaking nodes learn from such advertisements, if one or more neighbors are capable of propagating control plane and/or data plane resource usage information. The PCE Server nodes in a data center would use such information during path computation, to determine:—

If a tunnel path is feasible that would include LSR nodes in resource optimization capable data centers.

If a tunnel path is feasible that would exclude LSR nodes from resource optimization incapable data centers.

If a tunnel path is feasible that would include LSR(s) from currently known resource optimal data centers.

A PCE server node would use such information e.g. data center resource optimization capable and resource optimization incapable data center's nodes, as constraints to find feasible path(s) either during new tunnel setup or existing tunnel re-route or re-optimization.

This aspect includes:

A new TLV for OSPF, as TE Node DC Resource Optimization Capability Descriptor (DREMCD) TLV, to be carried within the Router Information LSA.

A new sub-TLV for IS-IS, as TE Node DC Resource Optimization Capability Descriptor (DREMCD) sub-TLV, to be carried within the IS-IS Capability TLV.

IGP-TE Node VM Resource Management Capability Descriptor in accordance with another aspect of the invention will now be described. The TE capable LSR nodes in data centers, might be able to detect and propagate resource optimality status of data plane and control plane, during heavy traffic load situation. Such TE LSR(s) should advertise their capabilities to neighbors, after adjacency is established. LSR nodes that receive such capability information, can optimally compute LSP paths either excluding such nodes or including those nodes.

TE Node DREMCD TLV Value Bit Flags: The TE Node DREMCD TLV Value contains a set of bit flags, where each bit represents a specific TE DC resource utilization efficiency management capability. This aspect defines the following DC resource utilization efficiency Management capabilities.

Bit DREM Capability Type

0 D bit—Data Plane DC resource utilization efficiency Advertisement, when set this flag indicates that the LSR is capable of advertising data plane DC resource utilization efficiency status.

1 C bit—Control Plane DC resource utilization efficiency Advertisement, when set this flag indicates that the LSR is capable of advertising control plane DC resource utilization efficiency status.

2 P bit—Primary LSP DC resource utilization efficiency Repair Advertisement, when set this flag indicates that the LSR is capable of DC resource utilization efficiency repair of primary path, i.e. capable of protection switchover when a protected primary path is congested at downstream LSR.

3 B bit—Backup LSP DC resource utilization efficiency Reroute Advertisement, when set this flag indicates that the LSR is capable of DC resource utilization efficiency repair of backup path, i.e. capable of rerouting backup path, to an alternate path that is not congested at downstream LSR(s).

4 S bit—FRR Bypass Tunnel DC resource utilization efficiency Reroute Advertisement, when set this flag indicates that the LSR is capable of DC resource utilization efficiency repair of Bypass Tunnel path, i.e. capable of rerouting Bypass Tunnel, to an alternate path that is not congested at downstream LSR(s).

5-31 Reserved for future Capability assignment.

OSPF-TE Node VM Resource Management Capability Descriptor: The OSPF-TE Node DC resource utilization efficiency Management Capability Descriptor (OSPF-TE NDREMCD) TLV is a variable length TLV that contains a triplet {Type, Length, Value}, where 'Type' field is 2 octets, Length field is also 2-octets and the 'Value' field is multiples of 32-bit words. The Value filed is an array of Bit flags as defined above.

OSPF-TE NDREMCD TLV Structure: The OSPF-TE NDREMCD TLV has the following format:—

TYPE: 32774 (Taken from the experimental sub-range for types as documented in RFC 4970. This sub-range is not controlled by the IANA registry).

LENGTH: Variable (Multiple of 4).

VALUE: Array of units of 32 Bit Flags numbered from the MSB bit as Bit zero, where each Bit Flag represents a TE node's DC resource utilization efficiency management capability.

ISIS-TE Node VM Resource Management Capability Descriptor: The ISIS-TE Node DC resource utilization efficiency Management Capability Descriptor (ISIS-TE NDREMCD) sub-TLV is a variable length TLV that contains a triplet {Type, Length, Value}, where 'Type' field is 1 octet, Length field is 1 octet specifying the length of the value field, and the 'Value' field is multiples of octets. The Value field contains an array of Bit flags as defined above.

The ISIS-TE NDREMCD sub-TLV has the same format as the sub-TLV.

The ISIS-TE NDREMCD sub-TLV is carried as an optional sub-TLV within an IS-IS CAPABILITY TLV.

ISIS-TE NDREMCD sub-TLV Structure: The ISIS-TE NDREMCD sub-TLV has the following format:—

TYPE: XX (Value to be assigned from the current unused sub-range for types as documented in RFC 5305).

LENGTH: Variable (Multiple of 1).

VALUE: Array of units of 8 Bit Flags numbered from the MSB bit as Bit zero, where each Bit Flag represents a TE node's DC resource utilization efficiency management capability.

IGP-TE Node DREMCD Advertisement Processing: The TE Node DREMCD is advertised by a TE LSR to it's neighbors via OSPFv2 or OSPV3 Router Capability information advertisement, if the LSR has OSPF adjacency established with the neighbors. However if the LSR has IS-IS adjacency established with the neighbors, then TE Node DREMCD will be advertised via IS-IS Router Capability information advertisement. When a TE LSR learns DREM capability via the DREMCD advertisement, it MAY use such information as constraints for Path computation, so as to include such DREM capable nodes along the LSP path for new or re-routing Tunnel. When the DREM capability is first configured on a LSR node, the node will advertise DREMCD capability to it's TE capable neighbors. Subsequently if the DREM capability configuration of the TE node changes, i.e. capability is disabled or enabled via CLI, then it will re-advertise it's updated DREM capability in a new OSPF RI LSA or IS-IS RI LSP, as the case may be.

A TE node will also advertise a new OSPF RI LSA or IS-IS RI LSP containing the TE Node DREMCD TLV or sub-TLV, whenever the regular refresh is needed for the OSPF LSA or IS-IS LSP. If a TE LSR does not receive DREMCD advertisement from one or more neighbors, then it will assume those neighbors are:

Not capable of monitoring DC resource utilization efficiency status of the Data Plane or Control Plane.

Not capable of propagating any DC resource utilization efficiency information via OSPF or IS-IS routing extensions.

When an LSR node receives a new or updated DREMCD, via OSPF RI LSA or IS-IS RI LSP, the reach-ability of one or more TE routed destinations MAY be affected due to pre-existing policies or path constraints. Thus the local TE node MAY schedule CSPF computation to re-validate or re-optimize the TE paths of existing MPLS/GMPLS Tunnels originating from this node.

OSPF-TE Node DREMCD Advertisement Procedure: When OSPF-TE or GMPLS-OSPF-TE extension is used for Traffic engineering in MPLS/GMPLS networks, the LSR nodes will advertise their DREM capabilities via OSPFv2

Router Information LSA, (Opaque type of 4 and Opaque ID of 0) or via OSPFv3 Router Information LSA, (Function code of 12).

The flooding scope for these LSAs are Area-local and so these should be carried within OSPFv2 Type-10 RI LSA or within OSPFv3 RI LSA, with S1 bit set and the S2 bit cleared. Since the DC resource utilization efficiency measurement and advertisement as proposed in this invention is meant only for MPLS/GMPLS traffic engineered networks, unless a routing/switching node is TE capable, the node MUST NOT, advertise DREMCD TLV, within OSPFv2/OSPFv3 Router Information LSA.

ISIS-TE Node DREMCD Advertisement Procedure: When ISIS-TE or GMPLS-ISIS-TE extension is used for Traffic engineering in MPLS/GMPLS networks, the LSR nodes will advertise their DREM capabilities via IS-IS Capability Information TLV. The flooding scope for the DREMCD sub-TLV is Area-local and so it should be carried within an IS-IS CAPABILITY TLV with S Flag cleared. Since the DC resource utilization efficiency measurement and advertisement as proposed in this invention is meant only for MPLS/GMPLS traffic engineered networks, unless a routing/switching node is TE capable, the node MUST NOT, advertise DREMCD sub-TLV, within IS-IS CAPABILITY TLV.

Backward Compatibility of DREMCD Advertisement: The DREMCD TLV defined in this invention does not introduce any interoperability issues. An OSPFv2/OSPFv3 router that does not support/recognize the DREMCD TLV, would silently ignore the TLV, when received in RI LSA. An IS-IS router that does not support/recognize the DREMCD sub-TLV, would silently ignore the sub-TLV, when received in CAPABILITY TLV of RI LSP. If the DREMCD TLV or DREMCD sub-TLV is absent in a received OSPFv2/OSPFv3 RI LSA or IS-IS CAPABILITY TLV, respectively then the DREM capability of the sending Node is unknown. Reception of a DREMCD TLV or DREMCD sub-TLV MAY trigger CSPF path computation and consequently impact the reach-ability or optimality of TE Tunnels in the MPLS/GMPLS TE networks. However IP routing is not impacted, since normal SPF calculation for OPSF or IS-IS routing is not affected by receiving any DREMCD TLV or DREMCD sub-TLV.

Data Center VM Resource Usage Measurement Procedure in accordance with another aspect of the invention will now be described. In a server platform DC resource utilization efficiency refers to how well the VM application functions can perform without consuming much of platform resources, viz. CPU, memory, I/O bandwidth. In other words how good is the server platform performing w.r.t. VM resource utilization during its life cycle of VM traffic management operations.

Consuming less server platform resources would imply less of congestion or performance overhead. Thus DC resource consumption rate directly relates to the environmental pollution, safety and industrial economies. DC server platform resource usage optimization is of primary importance in data center or cloud computing networks.

VM Resource Usage Measurement Architecture: For DC resource utilization efficiency measurement purposes, below is a distributed software agent based architecture, for the data center server platforms hosting VMs. In this architecture a Master Agent is termed as 'DC resource utilization efficiency Management Master (DREM-Master)' which runs on one or more DC server platforms and periodically polls a group of Slave Agent(s). A Slave Agent is termed as 'DC resource utilization efficiency Management Slave (DREM-Slave)' which runs on the Server platform with VM resource usage monitor components. The DREM-Slave in each Server platform periodically polls for CPU, memory and I/O bandwidth usage, to determine DC resource utilization efficiency of local hardware components. The architecture uses the consumer/producer model for DC resource utilization efficiency measurement purposes. The Server platform is the resource producers or suppliers and the VM nodes are the DC resource consumers.

The architecture also defines an aggregator framework, where the DREM-Master plays the role of an DC resource utilization efficiency data aggregator. In other words, an DREM-Master in addition to monitoring and measuring DC resource utilization efficiency of its local server, also aggregates the monitored and measured DC resource utilization efficiency data from other DREM-Slave agents, for collective data maintenance or data reporting purposes.

VM Resource Usage Measurement Configuration Parameters: In order to monitor and determine the DC resource utilization efficiency status of both data plane and control plane, a DC server platform needs to be configured with minimum and maximum threshold parameters for the DC resource utilization by VMs.

The following configuration parameters may be needed for data plane DC resource utilization efficiency status determination.

NTh_Min—Minimum threshold for the DC resource usage count, from node wide global available resources, at which DC resource utilization efficiency degradation starts. When the DC resource usage count is below this threshold, the server platform is considered DC resource efficient at the global level.

NTh_Max—Maximum threshold for the DC resource usage count, from node wide global available resource. The DC resource utilization efficiency status starts from the minimum threshold and grows up to the maximum threshold. When the usage count exceeds the maximum threshold, the switch is considered 100% DC resource in-efficient w.r.t. the global available resource.

A Switching hardware MAY support up-to 'Max_Link' number of Link(s).

LTh_Min(L)—Minimum threshold for the DC resource usage count, from per-Link available resource for Link 'L', where 0<=L<=Max_Link. When the DC resource usage count is below this threshold, the switching data plane is considered resource efficient at the Link level.

LTh_Max(L)—Maximum threshold for the DC resource usage count, from per-Link available resource for Link 'L', where 0<=L<=Max_Link. The DC resource utilization efficiency status starts from the minimum threshold and grows up to the maximum threshold. When the usage count exceeds the maximum threshold, the switch is considered 100% resource in-efficient w.r.t. per-Link available resource.

The following configuration parameters may be needed for control plane DC resource utilization efficiency status determination.

CpuTh_Min—Minimum threshold for the overall percentage resource utilization, by the control plane CPU and peripheral I/O devices.

CpuTh_Max—Maximum threshold for the overall percentage resource utilization, by the control plane CPU and peripheral I/O devices.

Switching Data Plane Resource Usage Measurement Procedure: When a traffic flow is admitted by the H/W or S/W switch in the data center, it will consume processing cycles of forwarding data path. These H/W or S/W processing cycles will trigger additional DC resource consumption, due to computational work to be performed by the packet forwarding engines. In one aspect, the processing of the traffic flow consumes available resource in the following proportions:—

'Y' number of resource items from the per-Link, available resource.

'Z' number of resource items from the Node wide global, available resource.

Then data plane DC resource utilization efficiency status at that instant can be expressed as follows:

If Y<LTh_Min(L), then Data Plane Link level resource consumption on Link 'L' is efficient.

If LTh_Min(L)<=Y<=LTh_Max(L), then Data Plane Link level resource consumption on Link 'L' is in-efficient, by a factor of LDREF(L)=[Y−LTh_Min(L)]/[LTh_Max(L)−LTh_Min(L)]. The percentage DC resource utilization efficiency status in this case can be expressed as PLDREI(L)= [LDREF(L)×100] %.

If Y>LTh_Max(L), then Data Plane Link level resource consumption on Link 'L' is considered fully in-efficient, i.e. 100%.

If Z<NTh_Min, then Data Plane node wide global resource consumption is efficient.

If NTh_Min<=Z<=NTh_Max, then Data Plane node wide global resource consumption is in-efficient, by a factor of NDREF=[Z−NTh_Min]/[NTh_Max−NTh_Min]. The percentage DC resource utilization efficiency status in this case can be expressed as PNDREI=[NDREF×100] %.

If Z>NTh_Max, then Data Plane node wide global resource consumption is considered fully in-efficient, i.e. 100%.

Switching Control Plane Resource Usage Measurement Procedure: At present modern Ethernet switching platforms use embedded software infrastructure that is capable of monitoring and calculating percentage utilization of resource by control plane CPU and attached peripheral I/O devices. Similarly the software switch (V-Switch) of the data center servers hosting VM(s), can make use of server's software infrastructure for monitoring and calculation of percentage resource utilization of Server platform's CPUs and peripheral I/O devices. Thus if at any instant the overall resource utilization by CPU and peripheral I/O devices, can be expressed as follows:

'C'—percentage utilization of resource by control plane CPU(s) and peripheral I/O devices.

Then control plane DC resource utilization efficiency status at that instant can be expressed as follows:—

If C<CpuTh_Min, then Control Plane CPU resource consumption is efficient.

If CpuTh_Min<=C<=CpuTh_Max, then Control Plane CPU resource consumption is inefficient, by a factor of CpuDREF=[C−CpuTh_Min]/[CpuTh_Max−CpuTh_Min]. The percentage DC resource utilization efficiency status in this case can be expressed as PCpuEEI=[CpuDREF×100] %.

If C>CpuTh_Max, then Control Plane CPU resource consumption is considered fully in-efficient, i.e. 100%.

Smoothly Averaged Resource Usage Level Measurement: During temporary network failures, software or hardware glitches, one or more traffic flows through the H/W switching systems or software switches (V-Switch) in data Center, may experience transient traffic loss, due to congestion overload, queuing drops and excessive transmission delays. However transient traffic loss may recover and switching delays may return to normalcy, after a network convergence. Thus if DC resource utilization efficiency level measured during transient excessive Resource consumption situation is instantly advertised to OPSF-TE or ISIS-TE neighbors, then frequent flooding of TE LSA or TE LSPs may contribute to more excessive Resource consumption. As a result of this frequent reroute of MPLS/GMPLS Tunnels over narrowly stable paths may result in further instability of the traffic engineering networks.

One aspect of the invention includes a mechanism to calculate the cumulative average value of measured DC resource utilization efficiency levels of various monitored resources during each recurring measurement interval. To compute smooth cumulative average values of the DC resource utilization efficiency level of a switching system resource, over a chosen periodic measurement interval, an Auto-Regressive Moving Average (ARMA) statistical model can be used. An ARMA model usually produces an exponentially weighted moving average (EWMA), $A_{n+1} = \lambda * A_n + (1-\lambda) * A_{n-1}$, where $A_n$ represents n-th iterative averaged value, and $0 < \lambda < 1$, which is a smoothed quantity as opposed to a spiked uneven data. For numerical computation on digital computers, the above EWMA function can be approximated using a Step function.

Data Center VM Resource Usage Advertisement Protocol in accordance with another aspect of the invention will now be described. The switching node will periodically perform DC resource utilization efficiency status monitoring and DC resource utilization efficiency level calculation, for the data plane and/or control plane, if operator has enabled this action via configuration. In the switching system, once the data plane and/or control plane DC resource utilization efficiency level is calculated, these information can be advertised to the routing neighbors of the local node using OSPF-TE and/or ISIS-TE protocol extensions. The switching node or a Server now, may choose not to advertise DC resource utilization efficiency level information to a neighbor, whose DREM capability is unknown. The DREM capability of a OSPF or IS-IS neighboring router is considered unknown, if it had not advertised, the DREMCD TLV in OSPFv2/OSPFv3 RI LSA or not advertised DREMCD sub-TLV in IS-IS CAPABILITY TLV.

OSPF-TE Extension for VM Resource Usage Advertisement: One aspect of the invention defines new extensions to the OSPF-TE and GMPLS-OSPF-TE's TE LSA advertisement protocols. These enhancements to the Traffic Engineering properties of OSPF routing and GMPLS-OSPF routing capable Links can be announced in OSPF-TE LSAs. The TE LSA, which is an opaque LSA with Area flooding scope [RFC3630] has a top-level TLV and one or more nested sub-TLVs in it for extensibility. Both the TLV and nested sub-TLVs are 32-bit aligned.

One aspect of this invention enhances the existing top-level TLV, viz. Link TLV by adding new sub-TLVs and define a new top-level TLV, 'Extended Node TE Status Attribute' (ENTESA), to support advertisement of switching node's DC resource utilization efficiency status information.

Node Level Resource Usage Status Encoding in OSPF-TE: The node level DC resource utilization efficiency status will be encoded in a new TLV, 'Extended Node TE Status Attribute' (ENTESA). This TLV has the following data structure:—

TLV TYPE: 2 Octet [32774, LANA registration not required for the experimental range 32768-32777].

TLV Length: 2 Octet indicating total length of a number of optional sub-TLVs.

TLV Value: 8*N Octets of sub-TLVs, of the following types.

Node's Data Plane Resource Usage Level Indicator sub-TLV: This sub-TLV contains the Data Plane's node wide global DC resource utilization efficiency level expressed in percentage unit. This sub-TLV is optional and may appear in the 'ENTESA' TLV. This sub-TLV is useful for traffic engineering policy constrained path computation.

sub-TLV TYPE: 2 Octet [32771, LANA registration not required for the experimental range 32768-32777].

sub-TLV Length: 2 Octet (Length of the value field=1).

Sub-TLV Value: 4 Octet (DC resource utilization efficiency level value between 0%-100%).

Node's Control Plane Processor Resource Usage Level Indicator sub-TLV: This sub-TLV contains the Control Plane processor's relative DC resource utilization efficiency, expressed in percentage unit. This sub-TLV is optional and may appear in the 'ENTESA' TLV. This sub-TLV is useful for traffic engineering policy constrained path computation.

sub-TLV TYPE: 2 Octet [32772, LANA registration not required for the experimental range 32768-32777].

sub-TLV Length: 2 Octet (Length of the value field=1).

Sub-TLV Value: 4 Octet (DC resource utilization efficiency level value between 0%-100%).

Link Level Resource Usage Status Encoding in OSPF-TE: The Link level DC resource utilization efficiency status will be encoded in new sub-TLVs, of the existing top-level TLV 'Link TLV' (TLV Type 2).

Data Plane per-Link Resource Usage Level Indicator sub-TLV: This sub-TLV contains the Data Plane's per-Link DC resource utilization efficiency level expressed in percentage unit. This sub-TLV is optional and should appear in a 'Link TLV'. This sub-TLV is useful for traffic engineering policy constrained path computation at Head End LSR. An LSR can also make use of this DC resource utilization efficiency information for Policy based Admission Control of new LSP setup requests and policy based pre-emption of already established LSPs.

sub-TLV TYPE: 2 Octet [32771, LANA registration not required for the experimental range 32768-32777].

sub-TLV Length: 2 Octet (Length of the value field=1).

Sub-TLV Value: 4 Octet (DC resource utilization efficiency level value between 0%-100%).

ISIS-TE Extension for Resource Usage Advertisement: One aspect of the invention defines new extensions to the ISIS-TE and GMPLS-ISIS-TE's TE LSP advertisement protocols. These enhancements to the Traffic Engineering properties of IS-IS routing and GMPLS-ISIS routing capable Links can be announced in IS-IS Link State Protocol Data Units (LSPs). For traffic engineering purposes, IS-IS LSP is used to carry a top-level TLV and one or more nested sub-TLVs in it for extensibility. One aspect of the invention enhance the existing top-level TLV, 'Extended IS Reachability TLV' by adding new sub-TLVs and define a new top-level TLV, 'Extended Node TE Status Attribute' (ENTESA), to support advertisement of switching node's DC resource utilization efficiency status information.

Node Level Resource Usage Status Encoding in ISIS-TE: The node level DC resource utilization efficiency status will be encoded in a new TLV, 'Extended Node TE Status Attribute' (ENTESA). This TLV has the following data structure:

TLV TYPE: 1 Octet (Value To be assigned later by LANA).

TLV Length: 1 Octet indicating total length of a number of optional sub-TLVs.

TLV Value: 0-253 octets of sub-TLVs, of the following types.

Node's Data Plane Resource Usage Level Indicator sub-TLV: This sub-TLV contains the Data Plane's node wide global DC resource utilization efficiency level expressed in percentage unit. This sub-TLV is optional and may appear in the 'ENTESA' TLV. This sub-TLV is useful for traffic engineering policy constrained path computation.

sub-TLV TYPE: 1 Octet (Experimental Value=1)

sub-TLV Length: 1 Octet (Length of the value field=1).

Sub-TLV Value: 1 Octet (DC resource utilization efficiency level value between 0%-100%).

Node's Control Plane Processor Resource Usage Level Indicator sub-TLV: This sub-TLV contains the Control Plane processor's relative DC resource utilization efficiency, expressed in percentage unit. This sub-TLV is optional and may appear in the 'ENTESA' TLV. This sub-TLV is useful for traffic engineering policy constrained path computation.

sub-TLV TYPE: 1 Octet (Experimental Value=2)

sub-TLV Length: 1 Octet (Length of the value field=1).

Sub-TLV Value: 1 Octet (DC resource utilization efficiency level value between 0%-100%).

Link Level Resource Usage Status Encoding in ISIS-TE: The Link level DC resource utilization efficiency status will be encoded in new sub-TLVs, of the existing top-level TLV 'Extended IS Reachability TLV' (TLV Type 22).

Data Plane per-Link Resource Usage Level Indicator sub-TLV: This sub-TLV contains the Data Plane's per-Link DC resource utilization efficiency level expressed in percentage unit. This sub-TLV is optional and should appear in each 'Extended IS Reachability TLV'. This sub-TLV is useful for traffic engineering policy constrained path computation at Head End LSR. An LSR can also make use of this DC resource utilization efficiency information for Policy based Admission Control of new LSP setup requests and policy based pre-emption of already established LSPs.

sub-TLV TYPE: 1 Octet (To be assigned from the unused range [23,249] by LANA later)

sub-TLV Length: 1 Octet (Length of the value field=1).

Sub-TLV Value: 1 Octet (DC resource utilization efficiency level value between 0%-100%).

Resource Usage Status Advertisement Scaling and Performance: Whenever the periodic DC resource utilization efficiency monitor detects a change in the DC resource utilization efficiency level, as calculated based on the comparison of switching system's DC resource usage against the pre-defined minimum and maximum thresholds the OSPF-TE LSA or ISIS-TE LSP origination would be triggered inside the routing/switching system. However not every change in the DC resource utilization efficiency level, need to be flooded via OSPF-TE LSA or ISIS-TE LSP. The originations of TE LSA(s) or TE LSP(s) should be rate limited to one, per certain configured time interval.

When large number of MPLS or GMPLS traffic engineered Tunnels with bandwidth reservation, are established or destroyed in the switching system, the OSPF-TE and ISIS-TE protocols would be required to flood large number of traffic engineering LSA(s)/LSP(s) throughout the TE area. Also during network outage in terms of Link going down or node going down, the Head End LER will be busy doing many CSPF computations and tunnel re-route or re-optimization signaling. This will trigger OSPF-TE LSA or ISIS-TE LSP flooding with up-to-date TE Link properties, which may contribute to the further elevated level of congestion and consequential excessive DC resource usage at data plane or control plane or both, resulting in OSPF or IS-SIS PDU drops. Thus in order to achieve a scalable performance and robust behavior of switching system, to avoid excessive DC resource usage, caused by traffic congestion, OSPF and IS-IS control packets should be given prioritized treatment via DSCP packet marking and PHB scheduling. To reduce the excessive DC resource usage caused by the overhead of LSA or LSP retransmission, exponential back-off algorithm should be used for the retransmission interval computation.

LSR Node behavior during Resource Usage Advertisement: After receiving OSPF-TE LSA or ISIS-TE LSP advertisements, an LSR node should not attempt to re-route or re-optimize all Tunnel paths simultaneously, as it might trigger heavy load on control plane processor or memory, contributing to the further DC resource sub-optimal level elevation at the local LSR node. Thus LSR nodes should be able to Throttle the maximum number of LSPs that can be re-optimized or re-routed after a hold down timer. Also the maximum number of new LSP signaling setup(s) or routing adjacency establishment at a LSR node should be throttled.

Figure 4J:
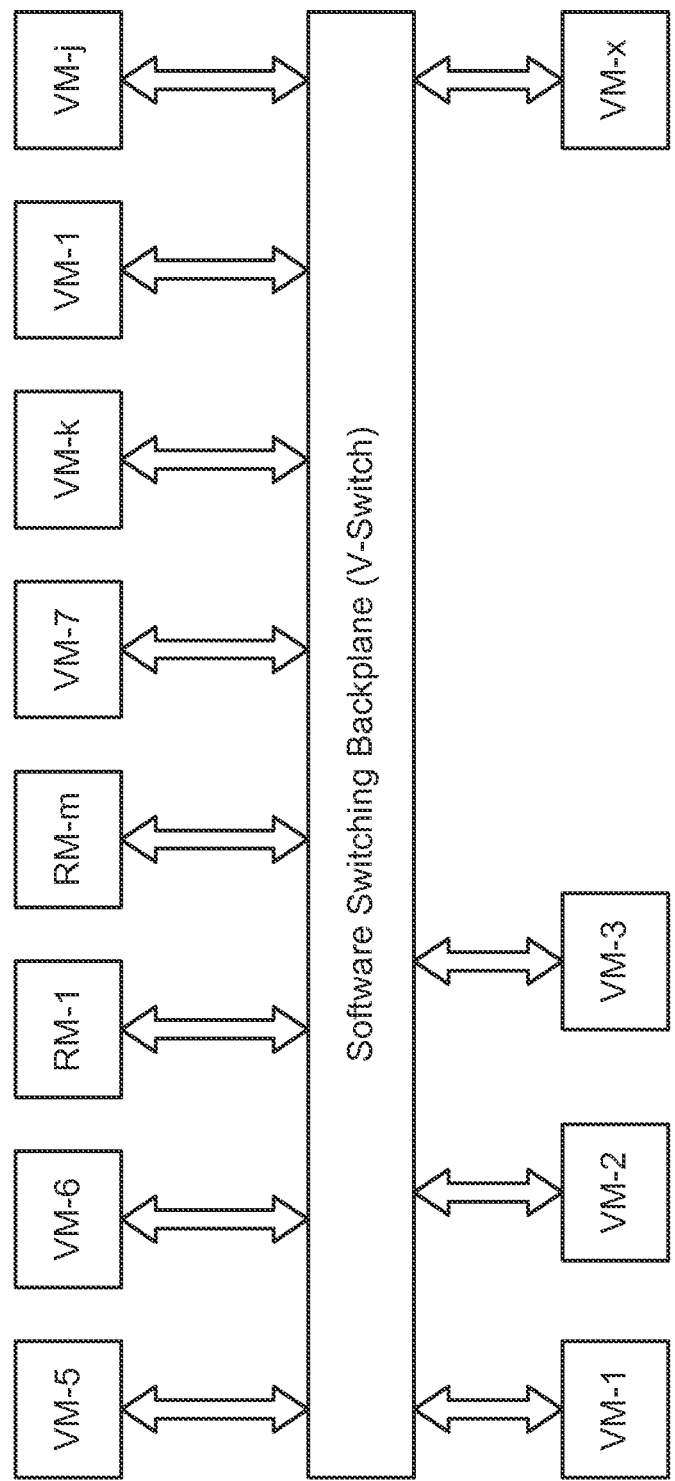
FIG. 4J is a data center server VM resource usage monitoring diagram, in accordance with various embodiments of the present invention.

DC Server resource utilization efficiency Management Interaction Diagram according to another aspect of the invention will now be described with reference to FIGS. 4J-M. Data center Server's software switching (V-Switch) block diagram depicting the interaction with multiple Virtual Machines (VMs) and multiple redundant Resource Monitors (RMs) for resource usage monitoring is shown in FIG. 4J wherein VM-x=>x-th instance of Virtual Machine.

RM-y=>y-th instance of Resource Usage Monitor

Figure 4K:
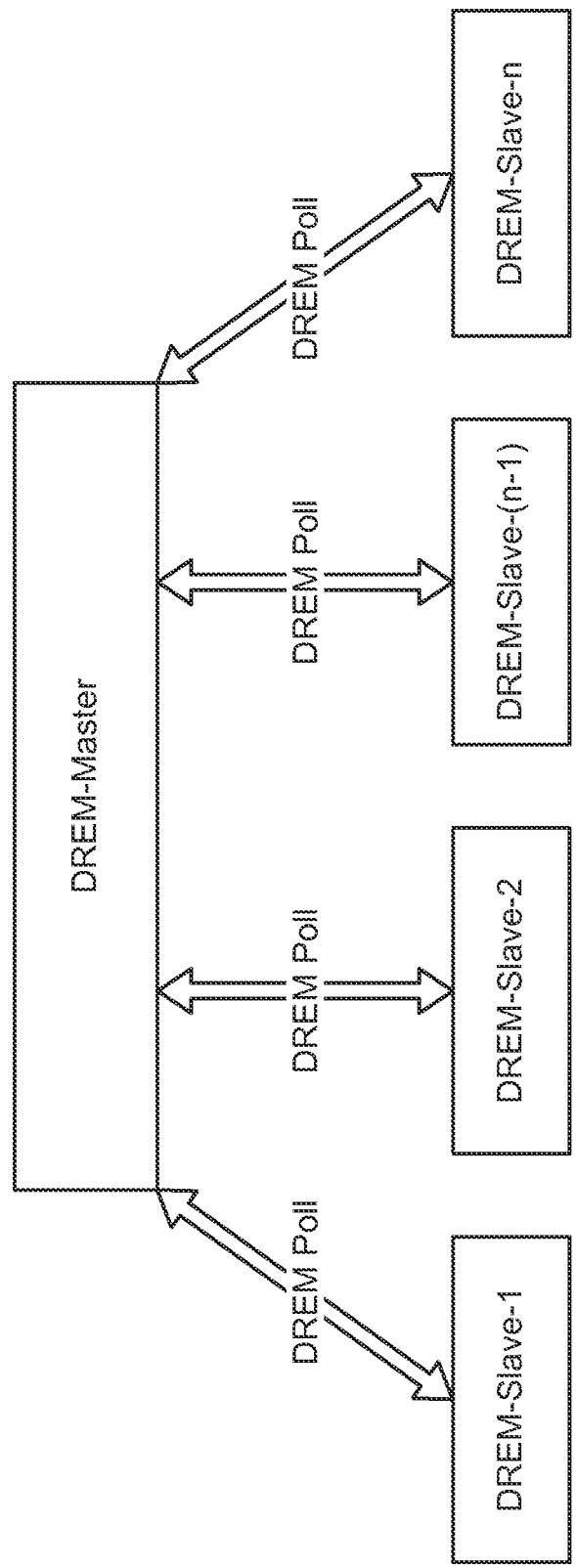
FIG. 4K is a data center server resource utilization efficiency management poll requests from master to slaves diagram in accordance with various embodiments of the present invention.

A Data Center's Server resource collection/polling logical block diagram depicting poll request & response interactions of DREM-Master component with 'n' number of DREM-Slave components is shown in FIG. 4K wherein:

DREM-Master—A DC resource utilization efficiency Management (DREM) S/W component that runs on a DC Server platform and periodically polls the DREM-Slave components that run on either server or every VM.

DREM-Slave—A DC resource utilization efficiency Management (DREM) S/W component that runs on every DC Server or hosted VM, and is responsible for monitoring and detecting DC resource utilization efficiency of VM(s).

DREM Poll—DREM-Master periodically sends a poll request message to fetch the monitored and calculated DC resource utilization efficiency level from each DREM-Slave on Server or every hosted VM.

Figure 4L:
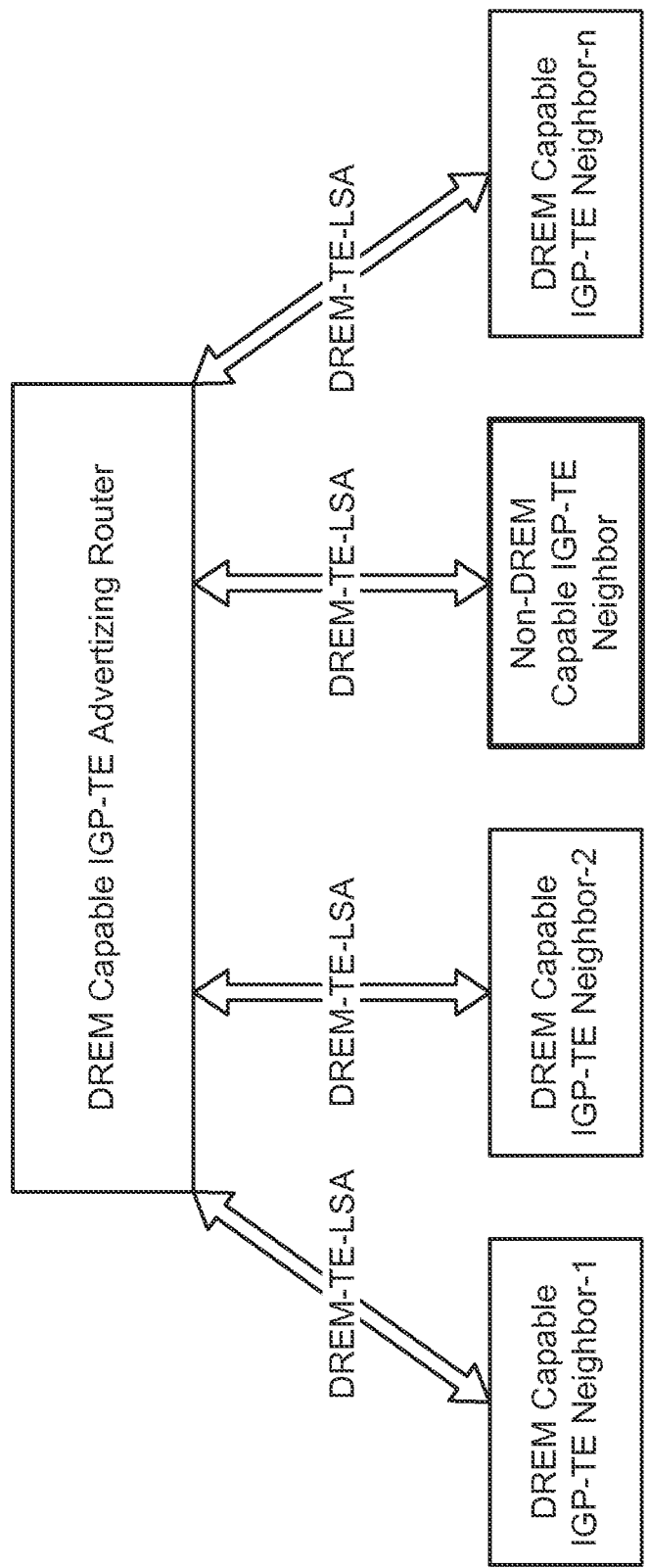
FIG. 4L is a IGP-TE LSA advertisement containing data center resource usage efficiency management information in accordance with various embodiments of the present invention.

Logical block diagram depicting interactions of IGP-TE (OSPF-TE or ISIS-TE) protocol in the Data Center Server or Ethernet Switching node (ToR) with 'n' number of IGP-TE speaking neighbor Servers or switches is shown in FIG. 4L wherein:

DEM-IGP-TE-Router—Local Server or router/switch advertising DC resource utilization efficiency Management (DREM) information via IGP-TE extended LSA.

DREM-IGP-TE-Neighbor—Neighbor Server or router/switch receiving DC resource utilization efficiency Management information via extended IGP-TE LSA (OPSF or IS-IS).

SDN based Provisioning and Control of VDC: VMs often communicate with their peer VMs located in remote interconnected data centers, through the NVE switches of the virtual network overlay. Hence, the embodiments of the present invention also provide for SDN based Provisioning and Control of VDC. The invention provides an architectural model of how switching network elements in virtualized data centers can be provisioned and controlled via OpenFlow controllers, in the presence of prevailing cloud manage NMS software tools. The proposed invention provides for provisioning and managing NVE switches in virtualized data centers, and also on the management and optimization of resources for the server platforms that are hosting the VMs.

In a Virtualized data center, when a Tenant system is configured with network connection parameters and the SLA, the Hypervisor notifies the NVE to provision the Tenant system's parameters at NVE. Various provisioning updates of the Tenant system (VM), are sent by the Hypervisor hosting the VMs, to the locally attached NVE. The NVE functionality at VDC can be extended to forward such VM provisioning instructions to the SDN Controller of the VDCs. Since a single SDN controller is capable of handling provisioning requests from multiple Data Centers, these collection of Data Centers which will be managed by a single SDN Controller can be treated as a VDC-SDN Domain. Thus when any of the NVEs which are part of the VDC-SDN receive any VM provisioning or VM management commands, will forward those commands to the VDC-SDN OpenFlow controller.

Thus when the VDC-SDN controller (V-SDN-C) has received all the network configuration and SLA parameters of the Tenant systems via the NVE nodes, the MAC address mapping, QoS policy and ACL configuration parameters can be transformed into OpenFlow rules. Using the OpenFlow protocol, the V-SDN-C then will be able to provision the NVE(s) in its VDC-SDN domain. Similarly when Tenant system (VM) state changes, viz. VM suspension, VM resume, VM configuration parameter updates etc. the attached NVE will propagate those event notifications to the V-SDN-C. The control plane protocols inside V-SDN-C will algorithmically re-compute L2/L3 routing and forwarding table entries and will provision those updated table entries to NVE(s) using OpenFlow provisioning protocol.

Figure 5:
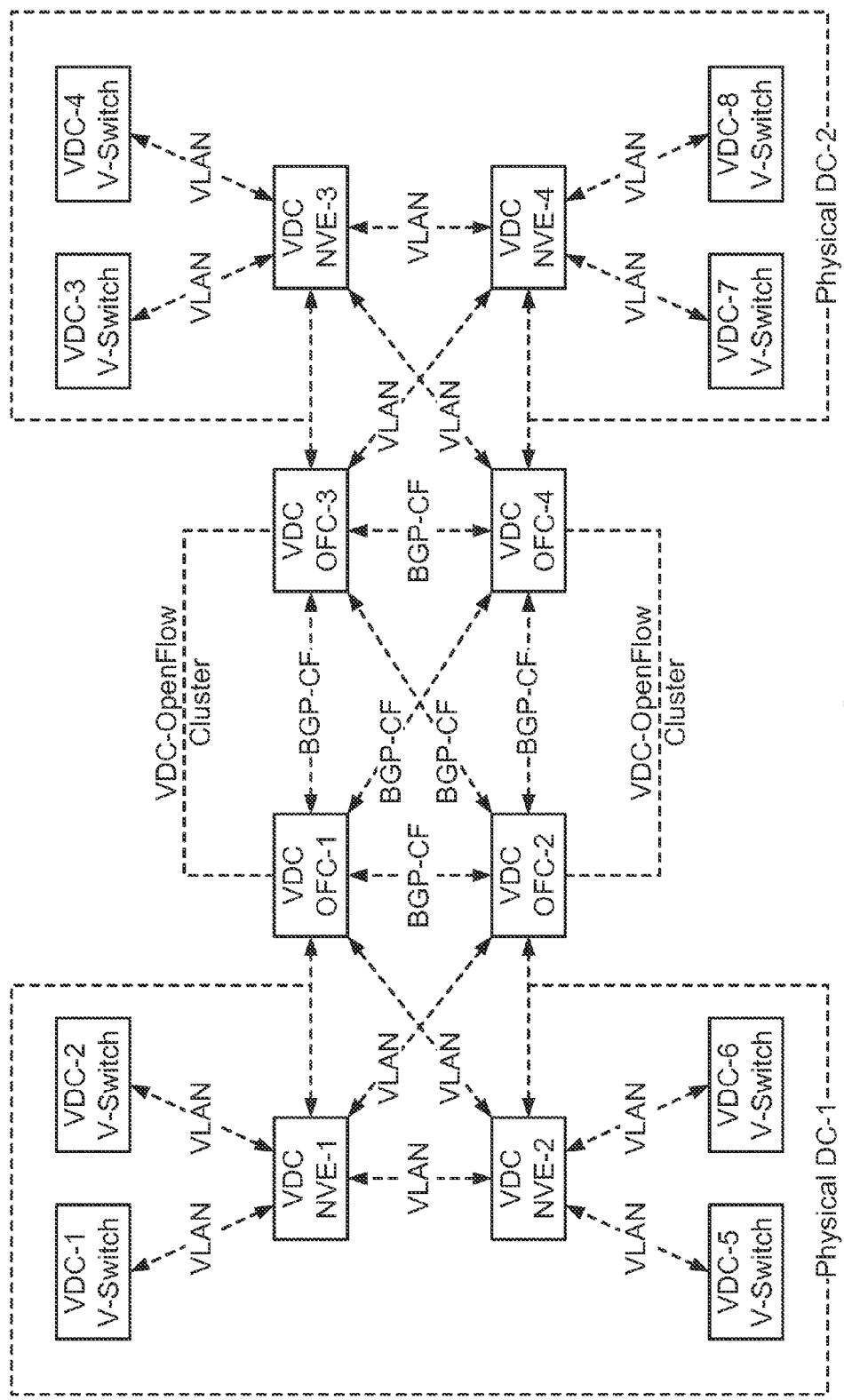
FIG. 5 is a schematic chart describing an SDN open flow based VDC provisioning architecture, in accordance with various embodiments of the present invention.

When a Tenant system (VM) is terminated gracefully or non-gracefully, the attached NVE will forward these VM termination requests to V-SDN-C. The Routing and Signaling Control Protocol stacks inside the V-SDN-C will re-Compute the routing and forwarding tables. The V-SDN-C will then using the Open-Flow protocol send those updated FIB table entries, and applicable QoS Policy rules and Flow classification rules to the NVE(s) which were involved in the communication with the terminated tenant system (VM). This can be further understood from FIG. 5.

This invention also provides for DC server's resource usage by the VM(s) to be monitored and resource usage efficiency values can be calculated and advertised in the VDC's switching network via OSPF-TE or ISIS-TE protocol extensions. These TE LSA advertisements are utilized by the PCE servers for Tunnel path computation and also for optimal location computation for VM placement or relocation within the interconnected VDC(s). The V-SDN-C's control plane can include a cluster of PCE(s) that can perform similar Tunnel Path computation and VM's optimal placement/relocation computation based on the learnt traffic engineering databases.

To build the traffic engineering databases, these PCE cluster inside the V-SDN-C should listen to the VM resource usage efficiency parameters advertised by the VDC's Resource Monitor. These advertisements can be forwarded by the NVE switches to the V-SDN-C, if the NVE also listens to these OPSF-TE and ISIS-TE advertisements. In virtualized data centers, however the Tenant systems communicate in their own virtual networks. The virtual network topology of tenants systems which communicate in L2-CUG or L3-CUG are separated among the different CUG(s).

In other words the virtual network represented by the L2-CUG or L3-CUG will have it's own separate instance of routing and signaling control plane. Thus the V-SDN-C control plane need to run multiple instances routing and signaling protocol stacks, with separate instance for each virtual network of the VDC. Similarly the PCE Cluster inside the V-SDN-C need to maintain traffic engineering databases and also run path computation algorithms on a per Virtual-Network Instance basis.

Figure 6:
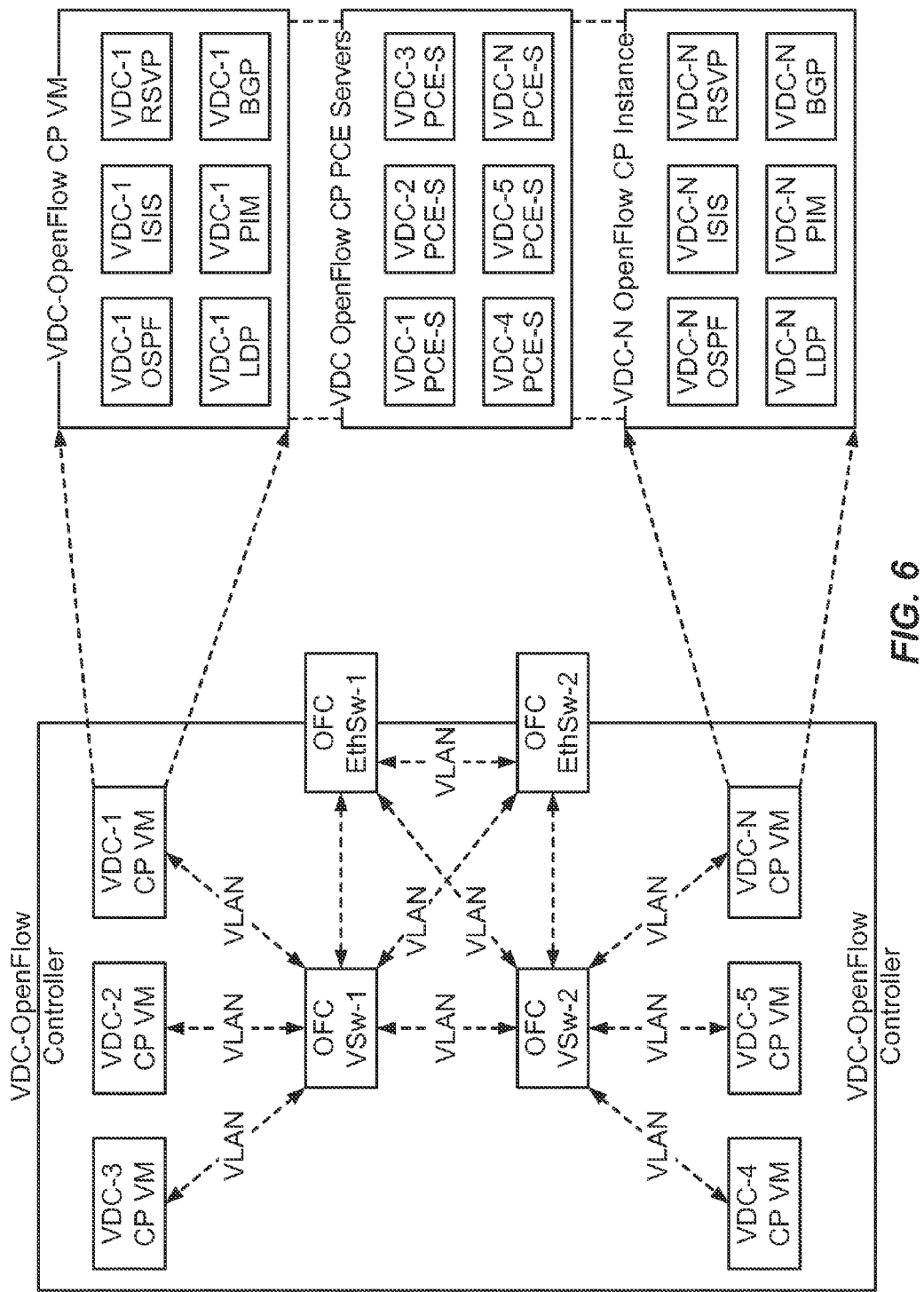
FIG. 6 is a schematic chart describing a VDC open flow controller internal architecture, in accordance with various embodiments of the present invention.

The underlay network representing IP/MPLS WAN backbone of the interconnected data centers is isolated from the virtual network overlay(s) that are transported over the underlay. Thus if the MPLS/GMPLS Transport Tunnel and/or L2-VPN Pseudo-wire provisioning is also controlled by the SDN OpenFlow based system, then either a separate SDN OpenFlow controller domain is used for provision the Underlay network switches or if the V-SDN-C is used, then a separate control plane instance should be used for the Underlay network topology. This can be further understood with reference to FIG. 6.

While the foregoing disclosure shows illustrative embodiments of the invention, it should be noted that various changes and modifications could be made herein without departing from the scope of embodiments of the invention as defined by the appended claims.

Likewise, the functions, steps and/or actions of the methods in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of determining an optimal placement of a virtual machine in a virtual data center network, wherein the method is implemented by a Path Computation Element (PCE), the method comprising:
   monitoring resource utilization by a plurality of virtual machines;
   receiving a virtual machine utilization summary from a server;
   updating a resource database of virtual machine utilization within the virtualized data center network based on the received virtual machine utilization summary;
   receiving a request associated with a first virtual machine; and
   determining and executing an optimal placement of the first virtual machine within the virtual data center network based on the updated resource database, wherein the determining the optimal placement comprises determining a data center in the virtual data center and a server in the data center that satisfies policy and resource constraints of the first virtual machine, and wherein the optimal placement is determined from a plurality of physical data centers and a plurality of physical servers in the plurality of physical data centers,
   wherein the resource database is maintained as a graph with vertices comprising servers in the virtual data center network and with edges indicating resource utilization attributes from the received virtual machine utilization summary in the graph, wherein the determining the optimal placement comprises utilizing an optimization applied to the graph to find an optimal vertex which satisfies the policy and resource constraints of the first virtual machine, and wherein the policy and resource constraints comprise a plurality of processing power, I/O bandwidth, memory size requirement, virtual disk space limit, and application performance requirement.

2. The method according to claim 1, wherein the PCE utilizes algorithmic computation calculations to find the optimal placement of the first virtual machine.

3. The method according to claim 2, wherein the PCE utilizes algorithmic computation calculations to find an optimal re-routing of an existing virtual machine.

4. The method according to claim 2, wherein the PCE dynamically maps the resource utilization status of a plurality of servers in the virtual data center network based on a status message received from a virtual data center monitor.

5. The method according to claim 2, wherein the PCE runs policy constraint combinatorial optimization algorithms to find a free virtual machine slot on a first server that will satisfy the policy constraints.

6. The method according to claim 2, wherein the virtual data center network is selected from one of a group of networks, the group comprising a Virtual extensible Local Area Network (VXLAN), a Network Virtualization Generic Routing Encapsulation (NV-GRE) network, a media access control (MAC)-in-MAC network and other Layer 2 over a Layer 3 network.

7. The method according to claim 1, wherein the graph is maintained in a similar manner as a traffic engineering database.

8. The method according to claim 1, wherein the monitoring comprises listening to traffic engineering advertisements from one or more of OSPF-TE, GMPLS-OSPF-TE, ISIS-TE, and GMPLS-ISIS-TE.

9. The method according to claim 1, wherein the PCE is configured to monitor network resource advertisements in the virtual data center and to communicate to the server comprising a Hypervisor for the virtual machine utilization summary.

10. An apparatus for determining an optimal placement of a virtual machine in a virtual data center network, the apparatus comprising:
    a circuit configured to monitor resource utilization by a plurality of virtual machines;
    a circuit configured to receive a virtual machine utilization summary from a server;
    a circuit configured to update a resource database of virtual machine utilization within the virtualized data center network based on the received virtual machine utilization summary;
    a circuit configured to receive a request associated with a first virtual machine; and
    a circuit configured to determine and execute an optimal placement of the first virtual machine within the virtual data center network based on the updated resource database, wherein determining the optimal placement comprises determining a data center in the virtual data center and a server in the data center that satisfies policy and resource constraints of the first virtual machine, and wherein the optimal placement is determined from a plurality of physical data centers and a plurality of physical servers in the plurality of physical data centers,
    wherein the resource database is maintained as a graph with vertices comprising servers in the virtual data center network and with edges indicating resource utilization attributes from the received virtual machine utilization summary in the graph, and wherein the determining the optimal placement comprises utilizing an optimization applied to the graph to find an optimal vertex which satisfies the policy and resource constraints of the first virtual machine, and wherein the policy and resource constraints comprise a plurality of processing power, I/O bandwidth, memory size requirement, virtual disk space limit, and application performance requirement.

11. The apparatus according to claim 10, wherein the graph is maintained in a similar manner as a traffic engineering database.

12. The apparatus according to claim 10, wherein the monitoring comprises listening to traffic engineering advertisements from one or more of OSPF-TE, GMPLS-OSPF-TE, ISIS-TE, and GMPLS-ISIS-TE.

13. The apparatus according to claim 10, wherein the apparatus is configured to monitor network resource advertisements in the virtual data center and to communicate to the server comprising a Hypervisor for the virtual machine utilization summary.

14. A Path Computation Engine (PCE) adapted to determine an optimal placement of a virtual machine in a virtual data center network, the PCE comprising:
one or more processors; and
memory comprising instructions that, when executed, cause the one or more processors to monitor resource utilization by a plurality of virtual machines;
receive a virtual machine utilization summary from a server;
update a resource database of virtual machine utilization within the virtualized data center network based on the received virtual machine utilization summary;
receive a request associated with a first virtual machine; and
determine and execute an optimal placement of the first virtual machine within the virtual data center network based on the updated resource database, wherein determining the optimal placement comprises determining a data center in the virtual data center and a server in the data center that satisfies policy and resource constraints of the first virtual machine, and wherein the optimal placement is determined from a plurality of physical data centers and a plurality of physical servers in the plurality of physical data centers,
wherein the resource database is maintained as a graph with vertices comprising servers in the virtual data center network and with edges indicating resource utilization attributes from the received virtual machine utilization summary in the graph, and wherein the determining the optimal placement comprises utilizing an optimization applied to the graph to find an optimal vertex which satisfies the policy and resource constraints of the first virtual machine, and wherein the policy and resource constraints comprise a plurality of processing power, I/O bandwidth, memory size requirement, virtual disk space limit, and application performance requirement.

15. The PCE according to claim 14, wherein the graph is maintained in a similar manner as a traffic engineering database.

16. The PCE according to claim 14, wherein the monitoring comprises listening to traffic engineering advertisements from one or more of OSPF-TE, GMPLS-OSPF-TE, ISIS-TE, and GMPLS-ISIS-TE.

17. The PCE according to claim 14, wherein the PCE is configured to monitor network resource advertisements in the virtual data center and to communicate to the server comprising a Hypervisor for the virtual machine utilization summary.

* * * * *